(12) United States Patent
Cerny et al.

(10) Patent No.: US 11,869,114 B2
(45) Date of Patent: *Jan. 9, 2024

(54) EFFICIENT MULTI-GPU RENDERING BY TESTING GEOMETRY AGAINST SCREEN REGIONS BEFORE RENDERING USING A PRETEST GPU

(71) Applicant: Sony Interactive Entertainment Inc., Tokyo (JP)

(72) Inventors: Mark E. Cerny, Los Angeles, CA (US); Florian Strauss, San Mateo, CA (US); Tobias Berghoff, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,105

(22) Filed: Mar. 1, 2022

(65) Prior Publication Data

US 2022/0188966 A1 Jun. 16, 2022

Related U.S. Application Data

(63) Continuation of application No. 16/780,680, filed on Feb. 3, 2020, now Pat. No. 11,263,718.

(51) Int. Cl.
*G06T 1/20* (2006.01)

(52) U.S. Cl.
CPC ....................... *G06T 1/20* (2013.01)

(58) Field of Classification Search
CPC ............................... G06T 1/20; G06T 15/005
See application file for complete search history.

(56) References Cited

U.S. PATENT DOCUMENTS

| | | | | |
|---|---|---|---|---|
| 2010/0115510 A1* | 5/2010 | Ford | ...................... | G06F 9/5077 718/1 |
| 2015/0187117 A1* | 7/2015 | Balci | ........................ | G06T 1/20 345/522 |
| 2015/0235341 A1* | 8/2015 | Mei | ........................... | G06T 1/60 345/426 |
| 2019/0206023 A1* | 7/2019 | Dimitrov | ............ | G06F 12/0842 |

\* cited by examiner

*Primary Examiner* — James A Thompson
*Assistant Examiner* — Kim Thanh T Tran
(74) *Attorney, Agent, or Firm* — PENILLA IP, APC

(57) ABSTRACT

A method for graphics processing. The method including rendering graphics for an application using a plurality of graphics processing units (GPUs). The method including dividing responsibility for the rendering of geometry of the graphics between the plurality of GPUs based on a plurality of screen regions that are interleaved, each GPU having a corresponding division of the responsibility which is known to the plurality of GPUs. The method including assigning a GPU a piece of geometry of an image frame generated by an application for geometry pretesting. The method including performing geometry pretesting at the GPU to generate information regarding the piece of geometry and its relation to each of the plurality of screen regions. The method including using the information at each of the plurality of GPUs when rendering the image frame.

20 Claims, 19 Drawing Sheets

610A

610B

| GPU | Object Responsibility | | | |
|---|---|---|---|---|
| | Object 0 | Object 1 | Object 2 | Object 3 |
| GPU A | -- | -- | X | -- |
| GPU B | X | -- | X | X |
| GPU C | -- | X | -- | X |
| GPU D | -- | X | X | X |

| A | B | A | B | A | B | A |
|---|---|---|---|---|---|---|
| C | D | C | D | C | D | C |
| A | B | A | B | A | B | A |
| C | D | C | D | C | D | C |

| A | B | C | D | A | B | C |
|---|---|---|---|---|---|---|
| C | D | A | B | C | D | A |
| B | A | D | C | B | A | D |
| D | C | B | A | D | C | B |

| A | B | C | D | A | B | C | D |
|---|---|---|---|---|---|---|---|
| C | D | A | B | C | D | A | B |
| B | A | D | C | B | A | D | C |
| D | C | B | A | D | C | B | A |

EFFICIENT MULTI-GPU RENDERING BY TESTING GEOMETRY AGAINST SCREEN REGIONS BEFORE RENDERING USING A PRETEST GPU

CLAIM OF PRIORITY

This application is a continuation of and claims priority to and the benefit of commonly owned, patent application, U.S. Ser. No. 16/780,680, filed on Feb. 3, 2020, entitled "SYSTEM AND METHOD FOR EFFICIENT MULTI-GPU RENDERING OF GEOMETRY BY PRETESTING AGAINST INTERLEAVED SCREEN REGIONS BEFORE RENDERING," the disclosure of which is hereby incorporated by reference in its entirety for all purposes.

CROSS REFERENCE TO RELATED APPLICATIONS

This application is related to commonly assigned, U.S. patent application Ser. No. 16/780,722, entitled "SYSTEM AND METHOD FOR EFFICIENT MULTI-GPU RENDERING OF GEOMETRY BY PRETESTING AGAINST SCREEN REGIONS USING PRIOR FRAME INFORMATION," the disclosure of which is hereby incorporated by reference in its entirety. This application is related to commonly assigned, U.S. patent application Ser. No. 16/780,745, entitled "SYSTEM AND METHOD FOR EFFICIENT MULTI-GPU RENDERING OF GEOMETRY BY PRETESTING AGAINST SCREEN REGIONS USING CONFIGURABLE SHADERS," the disclosure of which is hereby incorporated by reference in its entirety.

TECHNICAL FIELD

The present disclosure is related to graphic processing, and more specifically for multi-GPU collaboration when rendering an image for an application.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to execute more complex games, the ability to network between players for multi-player gaming, sharing of assets between players, sharing of instant experiences between players and/or spectators, allowing friends to watch a friend play a video game, having a friend join the on-going game play of a friend, and the like.

The cloud gaming server may be configured to provide resources to one or more clients and/or applications. That is, the cloud gaming server may be configured with resources capable of high throughput. For example, there are limits to the performance that an individual graphics processing unit (GPU) can attain. To render even more complex scenes or use even more complex algorithms (e.g. materials, lighting, etc.) when generating a scene, it may be desirable to use multiple GPUs to render a single image. However, usage of those graphics processing units equally is difficult to achieve. Further, even though there are multiple GPUs to process an image for an application using traditional technologies, there is not the ability to support a corresponding increase in both screen pixel count and density of geometry (e.g., four GPUs cannot write four times the pixels and/or process four times the vertices or primitives for an image).

It is in this context that embodiments of the disclosure arise.

SUMMARY

Embodiments of the present disclosure relate to using multiple GPUs in collaboration to render a single image, such as multi-GPU rendering of geometry for an application by pretesting against screen regions, which may be interleaved, before rendering.

Embodiments of the present disclosure disclose a method for graphics processing. The method includes rendering graphics for an application using a plurality of graphics processing units (GPUs). The method includes dividing responsibility for rendering of geometry of the graphics between the plurality of GPUs based on a plurality of screen regions, each GPU having a corresponding division of the responsibility which is known to the plurality of GPUs. Screen regions are interleaved. The method includes assigning a plurality of pieces of geometry of an image frame to the plurality of GPUs for geometry testing. The method includes assigning a GPU a piece of geometry of an image frame generated by an application for geometry testing. The method includes performing geometry testing at the GPU to generate information regarding the piece of geometry and its relation to each of the plurality of screen regions. The method includes rendering the piece of geometry using the information at each of the plurality of GPUs, where using the information can include, for example, skipping rendering entirely if it has been determined that the piece of geometry does not overlap any screen region assigned to a given GPU.

In another embodiment, a non-transitory computer-readable medium for performing a method is disclosed. The computer-readable medium including program instructions for rendering graphics for an application using a plurality of graphics processing units (GPUs). The computer-readable medium including program instructions for dividing responsibility for the rendering of geometry of the graphics between the plurality of GPUs based on a plurality of screen regions, each GPU having a corresponding division of the responsibility which is known to the plurality of GPUs, wherein screen regions in the plurality of screen regions are interleaved. The computer readable medium including program instructions for assigning a GPU a piece of geometry of an image frame generated by an application for geometry pretesting. The computer readable medium including program instructions for performing the geometry pretesting at the GPU to generate information regarding the piece of geometry and its relation to each of the plurality of screen regions. The computer readable medium including program instructions for using the information at each of the plurality of GPUs when rendering the image frame.

In still another embodiment, a computer system is disclosed including a processor and memory coupled to the processor and having stored therein instructions that, if executed by the computer system, cause the computer system to execute a method for graphics processing. The method including rendering graphics for an application using a plurality of graphics processing units (GPUs). The method including dividing responsibility for the rendering of geometry of the graphics between the plurality of GPUs based on a plurality of screen regions, each GPU having a corresponding division of the responsibility which is known to the plurality of GPUs, wherein screen regions in the plurality of screen regions are interleaved. The method including assigning a GPU a piece of geometry of an image frame generated by an application for geometry pretesting. The method including performing the geometry pretesting at the GPU to generate information regarding the piece of geometry and its relation to each of the plurality of screen regions. The method including using the information at each of the plurality of GPUs when rendering the image frame.

Embodiments of the present disclosure disclose a method for graphics processing. The method includes rendering graphics for an application using a plurality of graphics processing units (GPUs). The method includes dividing responsibility for the rendering of geometry of the graphics between the plurality of GPUs based on a plurality of screen regions, each GPU having a corresponding division of the responsibility which is known to the plurality of GPUs. The method includes performing geometry testing at a pretest GPU on a plurality of pieces of geometry of an image frame generated by an application to generate information regarding each piece of geometry and its relation to each of the plurality of screen regions. The method includes rendering the plurality of pieces of geometry at each of the plurality of GPUs using the information generated for each of the plurality of pieces of geometry, where using the information includes, for example, skipping rendering entirely if it has been determined that the piece of geometry does not overlap any screen region assigned to a given GPU.

In another embodiment, a non-transitory computer-readable medium for performing a method is disclosed. The computer-readable medium including program instructions for rendering graphics for an application using a plurality of graphics processing units (GPUs). The computer-readable medium including program instructions for dividing responsibility for the rendering of geometry of the graphics between the plurality of GPUs based on a plurality of screen regions, each GPU having a corresponding division of the responsibility which is known to the plurality of GPUs. The computer-readable medium including program instructions for performing geometry testing at a pretest GPU on a plurality of pieces of geometry of an image frame generated by an application to generate information regarding each piece of geometry and its relation to each of the plurality of screen regions. The computer-readable medium including program instructions for rendering the plurality of pieces of geometry at each of the plurality of GPUs using the information generated for each of the plurality of pieces of geometry, where using the information includes, for example, skipping rendering entirely if it has been determined that the piece of geometry does not overlap any screen region assigned to a given GPU.

In still another embodiment, a computer system is disclosed including a processor and memory coupled to the processor and having stored therein instructions that, if executed by the computer system, cause the computer system to execute a method for graphics processing. The method including rendering graphics for an application using a plurality of graphics processing units (GPUs). The method includes dividing responsibility for the rendering of geometry of the graphics between the plurality of GPUs based on a plurality of screen regions, each GPU having a corresponding division of the responsibility which is known to the plurality of GPUs. The method includes performing geometry testing at a pretest GPU on a plurality of pieces of geometry of an image frame generated by an application to generate information regarding each piece of geometry and its relation to each of the plurality of screen regions. The method includes rendering the plurality of pieces of geometry at each of the plurality of GPUs using the information generated for each of the plurality of pieces of geometry, where using the information includes, for example, skipping rendering entirely if it has been determined that the piece of geometry does not overlap any screen region assigned to a given GPU.

Embodiments of the present disclosure disclose a method for graphics processing. The method includes rendering graphics for an application using a plurality of graphics processing units (GPUs). The method includes dividing responsibility for the rendering of geometry of the graphics between the plurality of GPUs based on a plurality of screen regions, each GPU having a corresponding division of the responsibility which is known to the plurality of GPUs. The method includes rendering a first plurality of pieces of geometry at the plurality of GPUs during a rendering phase of a previous image frame generated by an application. The method includes generating statistics for the rendering of the previous image frame. The method includes assigning based on the statistics a second plurality of pieces of geometry of a current image frame generated by the application to the plurality of GPUs for geometry testing. The method includes performing geometry testing at a current image frame on the second plurality of pieces of geometry to generate information regarding each piece of the second plurality of pieces of geometry and its relation to each of the plurality of screen regions, wherein the geometry testing is performed at each of the plurality of GPUs based on the assigning. The method includes rendering the second plurality of pieces of geometry at each of the plurality of GPUs using the information generated for each of the second plurality of pieces of geometry, where using the information can include, for example, skipping rendering entirely if it has been determined that the piece of geometry does not overlap any screen region assigned to a given GPU.

In another embodiment, a non-transitory computer-readable medium for performing a method is disclosed. The computer-readable medium including program instructions for rendering graphics for an application using a plurality of graphics processing units (GPUs). The computer-readable medium including program instructions for dividing responsibility for the rendering of geometry of the graphics between the plurality of GPUs based on a plurality of screen regions, each GPU having a corresponding division of the responsibility which is known to the plurality of GPUs. The computer-readable medium including program instructions for rendering a first plurality of pieces of geometry at the plurality of GPUs during a rendering phase of a previous image frame generated by an application. The computer-readable medium including program instructions for generating statistics for the rendering of the previous image frame. The computer-readable medium including program instructions for assigning based on the statistics a second plurality of pieces of geometry of a current image frame generated by the application to the plurality of GPUs for geometry testing. The computer-readable medium including program instructions for performing geometry testing at a current image frame on the second plurality of pieces of geometry to generate information regarding each piece of the second plurality of pieces of geometry and its relation to each of the plurality of screen regions, wherein the geometry testing is performed at each of the plurality of GPUs based on the assigning. The computer-readable medium including program instructions for rendering the second plurality of pieces of geometry at each of the plurality of GPUs using the information generated for each of the second plurality of pieces of geometry, where using the information can include, for example, skipping rendering entirely if it has been determined that the piece of geometry does not overlap any screen region assigned to a given GPU.

In still another embodiment, a computer system is disclosed including a processor and memory coupled to the processor and having stored therein instructions that, if executed by the computer system, cause the computer system to execute a method for graphics processing. The method includes rendering graphics for an application using a plurality of graphics processing units (GPUs). The method includes dividing responsibility for the rendering of geometry of the graphics between the plurality of GPUs based on a plurality of screen regions, each GPU having a corresponding division of the responsibility which is known to the plurality of GPUs. The method includes rendering a first plurality of pieces of geometry at the plurality of GPUs during a rendering phase of a previous image frame generated by an application. The method includes generating statistics for the rendering of the previous image frame. The method includes assigning based on the statistics a second plurality of pieces of geometry of a current image frame generated by the application to the plurality of GPUs for geometry testing. The method includes performing geometry testing at a current image frame on the second plurality of pieces of geometry to generate information regarding each piece of the second plurality of pieces of geometry and its relation to each of the plurality of screen regions, wherein the geometry testing is performed at each of the plurality of GPUs based on the assigning. The method includes rendering the second plurality of pieces of geometry at each of the plurality of GPUs using the information generated for each of the second plurality of pieces of geometry, where using the information can include, for example, skipping rendering entirely if it has been determined that the piece of geometry does not overlap any screen region assigned to a given GPU.

Embodiments of the present disclosure disclose a method for graphics processing. The method includes rendering graphics for an application using a plurality of graphics processing units (GPUs). The method includes dividing responsibility for the rendering of geometry of the graphics between the plurality of GPUs based on a plurality of screen regions, each GPU having a corresponding division of the responsibility which is known to the plurality of GPUs. The method includes assigning a plurality of pieces of geometry of an image frame to the plurality of GPUs for geometry testing. The method includes setting a first state configuring one or more shaders to perform the geometry testing. The method includes performing geometry testing at the plurality of GPUs on the plurality of pieces of geometry to generate information regarding each piece of geometry and its relation to each of the plurality of screen regions. The method includes setting a second state configuring the one or more shaders to perform rendering. The method includes rendering the plurality of pieces of geometry at each of the plurality of GPUs using the information generated for each of the plurality of pieces of geometry, where using the information includes, for example, skipping rendering entirely if it has been determined that the piece of geometry does not overlap any screen region assigned to a given GPU.

In another embodiment, a non-transitory computer-readable medium for performing a method is disclosed. The computer-readable medium including program instructions for rendering graphics for an application using a plurality of graphics processing units (GPUs). The computer-readable medium including program instructions for dividing responsibility for the rendering of geometry of the graphics between the plurality of GPUs based on a plurality of screen regions, each GPU having a corresponding division of the responsibility which is known to the plurality of GPUs. The computer-readable medium including program instructions for assigning a plurality of pieces of geometry of an image frame to the plurality of GPUs for geometry testing. The computer-readable medium including program instructions for setting a first state configuring one or more shaders to perform the geometry testing. The computer-readable medium including program instructions for performing geometry testing at the plurality of GPUs on the plurality of pieces of geometry to generate information regarding each piece of geometry and its relation to each of the plurality of screen regions. The computer-readable medium including program instructions for setting a second state configuring the one or more shaders to perform rendering. The computer-readable medium including program instructions for rendering the plurality of pieces of geometry at each of the plurality of GPUs using the information generated for each of the plurality of pieces of geometry, where using the information includes, for example, skipping rendering entirely if it has been determined that the piece of geometry does not overlap any screen region assigned to a given GPU.

In still another embodiment, a computer system is disclosed including a processor and memory coupled to the processor and having stored therein instructions that, if executed by the computer system, cause the computer system to execute a method for graphics processing. The method includes rendering graphics for an application using a plurality of graphics processing units (GPUs). The method includes dividing responsibility for the rendering of geometry of the graphics between the plurality of GPUs based on a plurality of screen regions, each GPU having a corresponding division of the responsibility which is known to the plurality of GPUs. The method includes assigning a plurality of pieces of geometry of an image frame to the plurality of GPUs for geometry testing. The method includes setting a first state configuring one or more shaders to perform the geometry testing. The method includes performing geometry testing at the plurality of GPUs on the plurality of pieces of geometry to generate information regarding each piece of geometry and its relation to each of the plurality of screen regions. The method includes setting a second state configuring the one or more shaders to perform rendering. The method includes rendering the plurality of pieces of geometry at each of the plurality of GPUs using the information generated for each of the plurality of pieces of geometry, where using the information includes, for example, skipping rendering entirely if it has been determined that the piece of geometry does not overlap any screen region assigned to a given GPU.

Embodiments of the present disclosure disclose a method for graphics processing. The method includes rendering graphics for an application using a plurality of graphics processing units (GPUs). The method includes dividing responsibility for the rendering of geometry of the graphics between the plurality of GPUs based on a plurality of screen regions, each GPU having a corresponding division of the responsibility which is known to the plurality of GPUs. The method includes assigning a plurality of pieces of geometry of an image frame to the plurality of GPUs for geometry testing. The method includes interleaving a first set of shaders to perform geometry testing and rendering on a first set of pieces of geometry with a second set of shaders to perform geometry testing and rendering on a second set of pieces of geometry. The geometry testing generates corresponding information regarding each piece of geometry in the first set or second set and its relation to each of the plurality of screen regions. The corresponding information is used by the plurality of GPUs to render each piece of geometry in first set or second set, where using the information includes, for example, skipping rendering entirely if it has been determined that the piece of geometry does not overlap any screen region assigned to a given GPU.

In another embodiment, a non-transitory computer-readable medium for performing a method is disclosed. The computer-readable medium including program instructions for rendering graphics for an application using a plurality of graphics processing units (GPUs). The computer-readable medium including program instructions for dividing responsibility for the rendering of geometry of the graphics between the plurality of GPUs based on a plurality of screen regions, each GPU having a corresponding division of the responsibility which is known to the plurality of GPUs. The computer-readable medium including program instructions for assigning a plurality of pieces of geometry of an image frame to the plurality of GPUs for geometry testing. The computer-readable medium including program instructions for interleaving a first set of shaders to perform geometry testing and rendering on a first set of pieces of geometry with a second set of shaders to perform geometry testing and rendering on a second set of pieces of geometry. The geometry testing generates corresponding information regarding each piece of geometry in the first set or second set and its relation to each of the plurality of screen regions. The corresponding information is used by the plurality of GPUs to render each piece of geometry in first set or second set, where using the information includes, for example, skipping rendering entirely if it has been determined that the piece of geometry does not overlap any screen region assigned to a given GPU.

In still another embodiment, a computer system is disclosed including a processor and memory coupled to the processor and having stored therein instructions that, if executed by the computer system, cause the computer system to execute a method for graphics processing. The method includes rendering graphics for an application using a plurality of graphics processing units (GPUs). The method includes dividing responsibility for the rendering of geometry of the graphics between the plurality of GPUs based on a plurality of screen regions, each GPU having a corresponding division of the responsibility which is known to the plurality of GPUs. The method includes assigning a plurality of pieces of geometry of an image frame to the plurality of GPUs for geometry testing. The method includes interleaving a first set of shaders to perform geometry testing and rendering on a first set of pieces of geometry with a second set of shaders to perform geometry testing and rendering on a second set of pieces of geometry. The geometry testing generates corresponding information regarding each piece of geometry in the first set or second set and its relation to each of the plurality of screen regions. The corresponding information is used by the plurality of GPUs to render each piece of geometry in first set or second set, where using the information includes, for example, skipping rendering entirely if it has been determined that the piece of geometry does not overlap any screen region assigned to a given GPU.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 7B-1 illustrates an image including four objects rendered by multiple GPUs, and shows the screen region responsibilities for each GPU when rendering the objects of the image, in accordance with one embodiment of the present disclosure.

FIG. 7B-2 is a table illustrating the rendering performed by each GPU when rendering the four objects of FIG. 7B-1, in accordance with one embodiment of the present disclosure.

FIG. 9A-9C illustrates various strategies for assigning screen regions to corresponding GPUs when multiple GPUs collaborate to render a single image, in accordance with one embodiment of the present disclosure.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, there are limits to the performance that an individual GPU can attain, e.g. deriving from the limits on how large the GPU can be. To render even more complex scenes or use even more complex algorithms (e.g. materials, lighting, etc.) it is desirable to use multiple GPUs to render a single image, in embodiments of the present disclosure. In particular, various embodiments of the present disclosure describe methods and systems configured for performing multi-GPU rendering of geometry for an application by pretesting the geometry against screen regions, which may be interleaved. Multiple GPUs collaborate to generate an image. Responsibility for rendering is divided between a plurality of the GPUs based on screen regions. Prior to rendering the geometry, the GPUs generate information regarding the geometry and its relation to the screen regions. This allows the GPUs to more efficiently render the geometry or avoid rendering it altogether. As an advantage, for example this allows the multiple GPUs to render more complex scenes and/or images in the same amount of time.

With the above general understanding of the various embodiments, example details of the embodiments will now be described with reference to the various drawings. Throughout the specification, the reference to "application" or "game" or "video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

Throughout the specification, various embodiments of the present disclosure are described for multi-GPU processing or rendering of geometry for an application using an exemplary architecture having four GPUs. However, it is understood that any number of GPUs (e.g., two or more GPUs) may collaborate when rendering geometry for an application.

Figure 1:
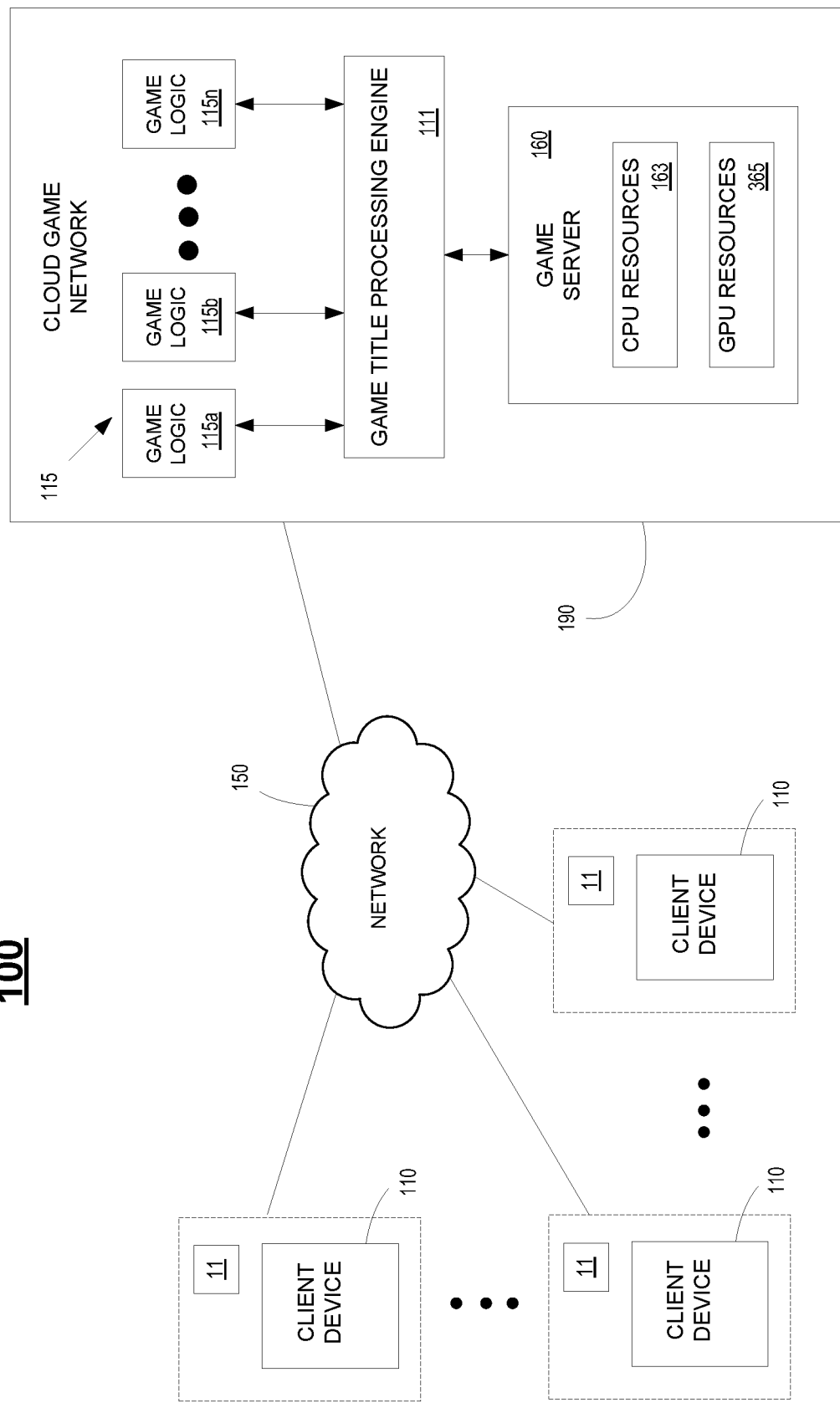
FIG. 1 is a diagram of a system for providing gaming over a network between one or more cloud gaming servers configured for implementing multiple GPUs in collaboration to render a single image, including multi-GPU (graphics processing unit) rendering of geometry for an application by pretesting the geometry against screen regions, which may be interleaved, in accordance with embodiments of the present disclosure.

FIG. 1 is a diagram of a system for performing multi-GPU processing when rendering an image (e.g. image frame) for an application, in accordance with one embodiment of the present disclosure. The system is configured to provide gaming over a network between one or more cloud gaming servers, and more specifically is configured for the collaboration of multiple GPUs to render a single image of an application, in accordance with embodiments of the present disclosure. Cloud gaming includes the execution of a video game at the server to generate game rendered video frames, which are then sent to a client for display. In particular, system 100 is configured for efficient multi-GPU rendering of geometry for an application by pretesting against screen regions, which may be interleaved, before rendering.

Although FIG. 1 illustrates the implementation of multi-GPU rendering of geometry between one or more cloud gaming servers of a cloud gaming system, other embodiments of the present disclosure provide for efficient multi-GPU rendering of geometry for an application by performing region testing while rendering within a stand-alone system, such as a personal computer or gaming console that includes a high-end graphics card having multiple GPUs.

It is also understood that the multi-GPU rendering of geometry may be performed using physical GPUs, or virtual GPUs, or a combination of both, in various embodiments (e.g. in a cloud gaming environment or within a stand-alone system). For example, virtual machines (e.g. instances) may be created using a hypervisor of a host hardware (e.g. located at a data center) utilizing one or more components of a hardware layer, such as multiple CPUs, memory modules, GPUs, network interfaces, communication components, etc. These physical resources may be arranged in racks, such as racks of CPUs, racks of GPUs, racks of memory, etc., wherein the physical resources in the racks may be accessed using top of rack switches facilitating a fabric for assembling and accessing of components used for an instance (e.g. when building the virtualized components of the instance). Generally, a hypervisor can present multiple guest operating systems of multiple instances that are configured with virtual resources. That is, each of the operating systems may be configured with a corresponding set of virtualized resources supported by one or more hardware resources (e.g. located at a corresponding data center). For instance, each operating system may be supported with a virtual CPU, multiple virtual GPUs, virtual memory, virtualized communication components, etc. In addition, a configuration of an instance that may be transferred from one data center to another data center to reduce latency. GPU utilization defined for the user or game can be utilized when saving a user's gaming session. The GPU utilization can include any number of configurations described herein to optimize the fast rendering of video frames for a gaming session. In one embodiment, the GPU utilization defined for the game or the user can be transferred between data centers as a configurable setting. The ability to transfer the GPU utilization setting enables for efficient migration of game play from data center to data center in case the user connects to play games from different geo locations.

System 100 provides gaming via a cloud game network 190, wherein the game is being executed remote from client device 110 (e.g. thin client) of a corresponding user that is playing the game, in accordance with one embodiment of the present disclosure. System 100 may provide gaming control to one or more users playing one or more games through the cloud game network 190 via network 150 in either single-player or multi-player modes. In some embodiments, the cloud game network 190 may include a plurality of virtual machines (VMs) running on a hypervisor of a host machine, with one or more virtual machines configured to execute a game processor module utilizing the hardware resources available to the hypervisor of the host. Network 150 may include one or more communication technologies. In some embodiments, network 150 may include $5^{th}$ Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the cloud game network 190 includes a game server 160 that provides access to a plurality of video games. Game server 160 may be any type of server computing device available in the cloud, and may be configured as one or more virtual machines executing on one or more hosts. For example, game server 160 may manage a virtual machine supporting a game processor that instantiates an instance of a game for a user. As such, a plurality of game processors of game server 160 associated with a plurality of virtual machines is configured to execute multiple instances of one or more games associated with gameplays of a plurality of users. In that manner, back-end server support provides streaming of media (e.g. video, audio, etc.) of gameplays of a plurality of gaming applications to a plurality of corresponding users. That is, game server 160 is configured to stream data (e.g. rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g. compressed) and streamed to the corresponding client device for display.

For example, a plurality of users may access cloud game network 190 via communication network 150 using corresponding client devices 110 configured for receiving streaming media. In one embodiment, client device 110 may be configured as a thin client providing interfacing with a back end server (e.g. cloud game network 190) configured for providing computational functionality (e.g. including game title processing engine 111). In another embodiment, client device 110 may be configured with a game title processing engine and game logic for at least some local processing of a video game, and may be further utilized for receiving streaming content as generated by the video game executing at a back-end server, or for other content provided by back-end server support. For local processing, the game title processing engine includes basic processor based functions for executing a video game and services associated with the video game. In that case, the game logic may be stored on the local client device 110 and is used for executing the video game.

Each of the client devices 110 may be requesting access to different games from the cloud game network. For example, cloud game network 190 may be executing one or more game logics that are built upon a game title processing engine 111, as executed using the CPU resources 163 and GPU resources 365 of the game server 160. For instance, game logic 115a in cooperation with game title processing engine 111 may be executing on game server 160 for one client, game logic 115b in cooperation with game title processing engine 111 may be executing on game server 160 for a second client, . . . and game logic 115n in cooperation with game title processing engine 111 may be executing on game server 160 for an Nth client.

In particular, client device 110 of a corresponding user (not shown) is configured for requesting access to games over a communication network 150, such as the internet, and for rendering for display images (e.g. image frame) generated by a video game executed by the game server 160, wherein encoded images are delivered to the client device 110 for display in association with the corresponding user. For example, the user may be interacting through client device 110 with an instance of a video game executing on game processor of game server 160. More particularly, an instance of the video game is executed by the game title processing engine 111. Corresponding game logic (e.g. executable code) 115 implementing the video game is stored and accessible through a data store (not shown), and is used to execute the video game. Game title processing engine 111 is able to support a plurality of video games using a plurality of game logics (e g gaming application), each of which is selectable by the user.

For example, client device 110 is configured to interact with the game title processing engine 111 in association with the gameplay of a corresponding user, such as through input commands that are used to drive gameplay. In particular, client device 110 may receive input from various types of input devices, such as game controllers, tablet computers, keyboards, gestures captured by video cameras, mice, touch pads, etc. Client device 110 can be any type of computing device having at least a memory and a processor module that is capable of connecting to the game server 160 over network 150. The back-end game title processing engine 111 is configured for generating rendered images, which is delivered over network 150 for display at a corresponding display in association with client device 110. For example, through cloud based services the game rendered images may be delivered by an instance of a corresponding game (e.g. game logic) executing on game executing engine 111 of game server 160. That is, client device 110 is configured for receiving encoded images (e.g. encoded from game rendered images generated through execution of a video game), and for displaying the images that are rendered on display 11. In one embodiment, display 11 includes an HMD (e.g. displaying VR content). In some embodiments, the rendered images may be streamed to a smartphone or tablet, wirelessly or wired, direct from the cloud based services or via the client device 110 (e.g. PlayStation® Remote Play).

In one embodiment, game server 160 and/or the game title processing engine 111 includes basic processor based functions for executing the game and services associated with the gaming application. For example, game server 160 includes central processing unit (CPU) resources 163 and graphics processing unit (GPU) resources 365 that are configured for performing processor based functions include 2D or 3D rendering, physics simulation, scripting, audio, animation, graphics processing, lighting, shading, rasterization, ray tracing, shadowing, culling, transformation, artificial intelligence, etc. In addition, the CPU and GPU group may implement services for the gaming application, including, in part, memory management, multi-thread management, quality of service (QoS), bandwidth testing, social networking, management of social friends, communication with social networks of friends, communication channels, texting, instant messaging, chat support, etc. In one embodiment, one or more applications share a particular GPU resource. In one embodiment, multiple GPU devices may be combined to perform graphics processing for a single application that is executing on a corresponding CPU.

In one embodiment, cloud game network 190 is a distributed game server system and/or architecture. In particular, a distributed game engine executing game logic is configured as a corresponding instance of a corresponding game. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network 190, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g. video frames, audio, etc.) for the gaming application in response to controller input by a player. The distribution synchronization layer is able to efficiently execute (e.g. through load balancing) those functions across the distributed processing entities, such that critical game engine components/functions are distributed and reassembled for more efficient processing.

Figure 2:
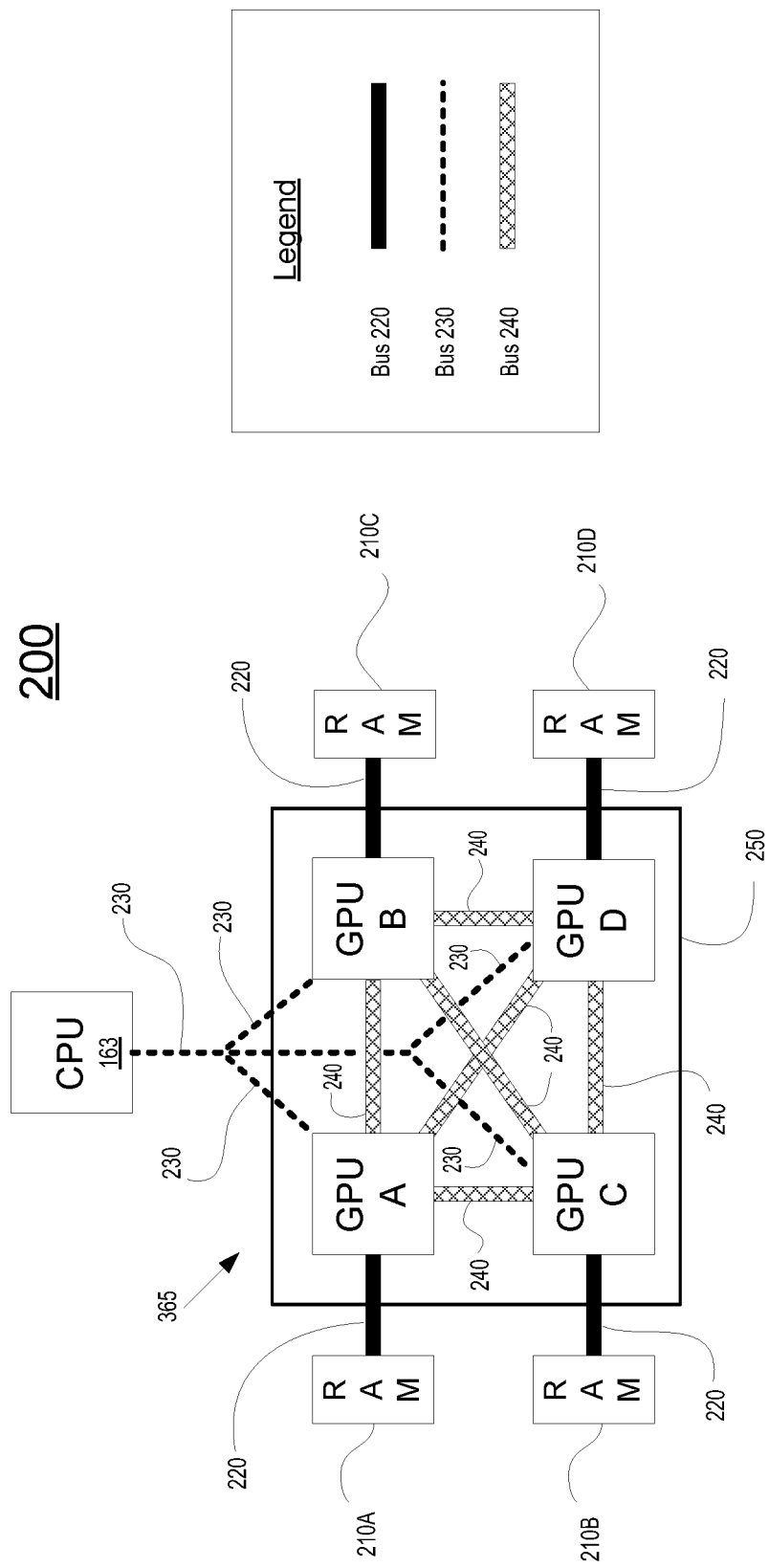
FIG. 2 is a diagram of a multi-GPU architecture wherein multiple GPUs collaborate to render a single image, in accordance with one embodiment of the present disclosure.

FIG. 2 is a diagram of an exemplary multi-GPU architecture 200 wherein multiple GPUs collaborate to render a single image of a corresponding application, in accordance with one embodiment of the present disclosure. It is understood that many architectures are possible in various embodiments of the present disclosure in which multiple GPUs collaborate to render a single image though not explicitly described or shown. For example, multi-GPU rendering of geometry for an application by performing region testing while rendering may be implemented between one or more cloud gaming servers of a cloud gaming system, or may be implemented within a stand-alone system, such as a personal computer or gaming console that includes a high-end graphics card having multiple GPUs, etc.

The multi-GPU architecture 200 includes a CPU 163 and multiple GPUs configured for multi-GPU rendering of a single image for an application, and/or each image in a sequence of images for the application. In particular, CPU 163 and GPU resources 365 are configured for performing processor based functions include 2D or 3D rendering, physics simulation, scripting, audio, animation, graphics processing, lighting, shading, rasterization, ray tracing, shadowing, culling, transformation, artificial intelligence, etc., as previously described.

For example, four GPUs are shown in GPU resources 365 of the multi-GPU architecture 200, though any number of GPUs may be utilized when rendering images for an application. Each GPU is connected via a high speed bus 220 to a corresponding dedicated memory, such as random access memory (RAM). In particular, GPU-A is connected to memory 210A (e.g., RAM) via bus 220, GPU-B is connected to memory 210B (e.g., RAM) via bus 220, GPU-C is connected to memory 210C (e.g., RAM) via bus 220, and GPU-D is connected to memory 210D (e.g., RAM) via bus 220.

Further, each GPU is connected to each other via bus 240 that depending on the architecture may be approximately equal in speed or slower than bus 220 used for communication between a corresponding GPU and its corresponding memory. For example, GPU-A is connected to each of GPU-B, GPU-C, and GPU-D via bus 240. Also, GPU-B is connected to each of GPU-A, GPU-C, and GPU-D via bus 240. In addition, GPU-C is connected to each of GPU-A, GPU-B, and GPU-D via bus 240. Further, GPU-D is connected to each of GPU-A, GPU-B, and GPU-C via bus 240.

CPU 163 connects to each of the GPUs via a lower speed bus 230 (e.g., bus 230 is slower than bus 220 used for communication between a corresponding GPU and its corresponding memory). In particular, CPU 163 is connected to each of GPU-A, GPU-B, GPU-C, and GPU-D.

Figure 3:
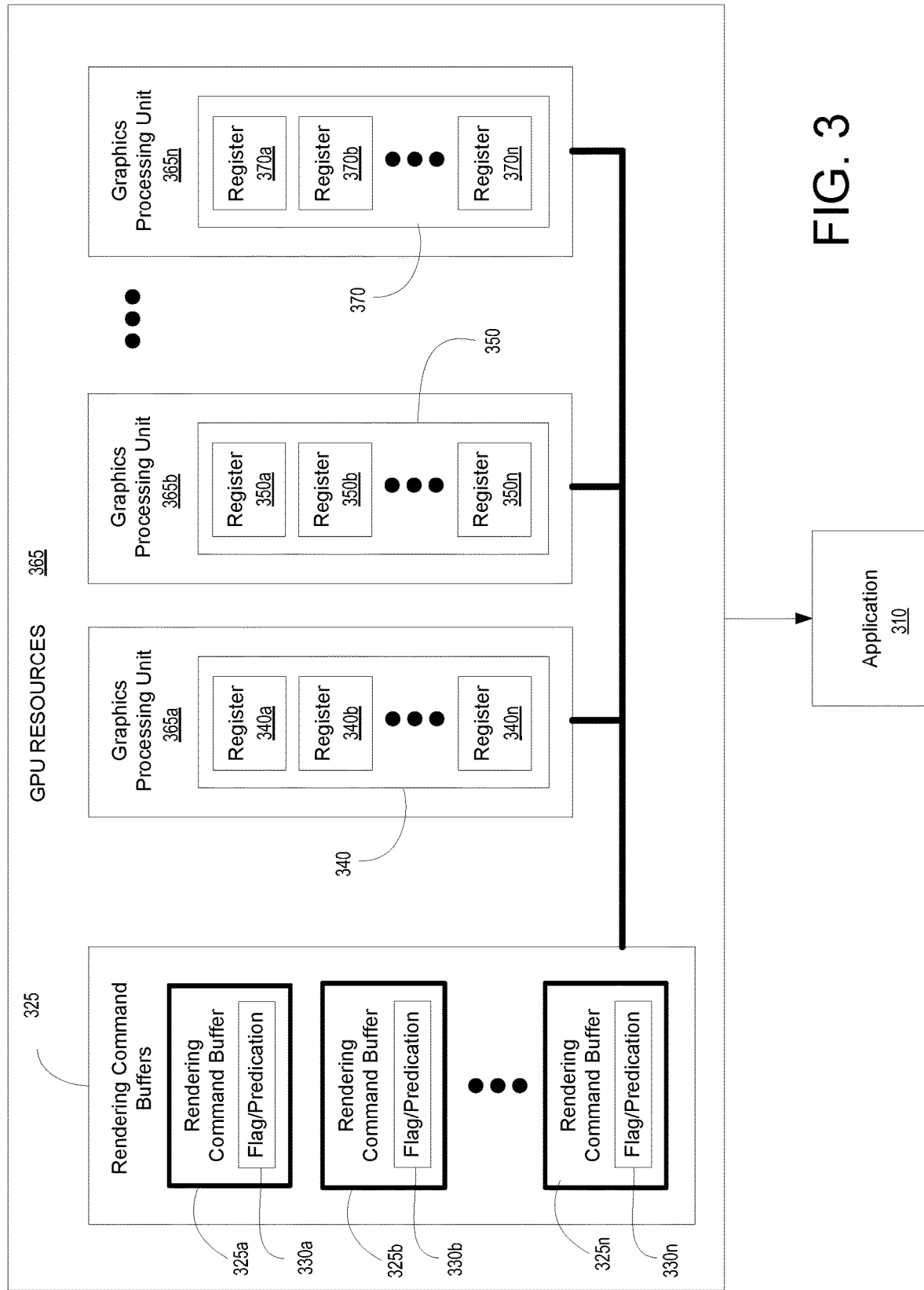
FIG. 3 is a diagram of multiple graphics processing unit resources configured for multi-GPU rendering of geometry for an application by pretesting the geometry against screen regions, which may be interleaved, in accordance with one embodiment of the present disclosure.

FIG. 3 is a diagram of graphics processing unit resources 365 configured for multi-GPU rendering of geometry for an image frame generated by an application by pretesting against screen regions, which may by interleaved, before rendering, in accordance with one embodiment of the present disclosure. For example, game server 160 may be configured to include GPU resources 365 in the cloud game network 190 of FIG. 1. As shown, GPU resources 365 includes multiple GPUs, such as GPU 365a, GPU 365b . . . GPU 365n. As previously described, various architectures may include multiple GPUs collaborating to render a single image by performing multi-GPU rendering of geometry for an application through region testing while rendering, such as implementing multi-GPU rendering of geometry between one or more cloud gaming servers of a cloud gaming system, or implementing multi-GPU rendering of geometry within a stand-alone system, such as a personal computer or gaming console that includes a high-end graphics card having multiple GPUs, etc.

In particular, in one embodiment, game server 160 is configured to perform multi-GPU processing when rendering a single image of an application, such that multiple GPUs collaborate to render a single image, and/or render each of one or more images of a sequence of images when executing an application. For example, game server 160 may include a CPU and GPU group that is configured to perform multi-GPU rendering of each of one or more images in a sequence of images of the application, wherein one CPU and GPU group could be implementing graphics and/or rendering pipelines for the application, in one embodiment. The CPU and GPU group could be configured as one or more processing devices. As previously described, the GPU and GPU group may include CPU 163 and GPU resources 365, which are configured for performing processor based functions include 2D or 3D rendering, physics simulation, scripting, audio, animation, graphics processing, lighting, shading, rasterization, ray tracing, shadowing, culling, transformation, artificial intelligence, etc.

GPU resources 365 are responsible and/or configured for rendering of objects (e.g. writing color or normal vector values for a pixel of the object to multiple render targets—MRTs) and for execution of synchronous compute kernels (e.g. full screen effects on the resulting MRTs); the synchronous compute to perform, and the objects to render are specified by commands contained in rendering command buffers 325 that the GPU will execute. In particular, GPU resources 365 is configured to render objects and perform synchronous compute (e.g. during the execution of synchronous compute kernels) when executing commands from the rendering command buffers 325, wherein commands and/or operations may be dependent on other operations such that they are performed in sequence.

For example, GPU resources 365 are configured to perform synchronous compute and/or rendering of objects using one or more rendering command buffers 325 (e.g. rendering command buffer 325*a*, rendering buffer 325*b* . . . rendering command buffer 325*n*). Each GPU in the GPU resources 365 may have their own command buffers, in one embodiment. Alternatively, when substantially the same set of objects are being rendered by each GPU (e.g., due to small size of the regions), the GPUs in GPU resources 365 may use the same command buffer or the same set of command buffers. Further, each of the GPUs in GPU resources 365 may support the ability for a command to be executed by one GPU, but not by another. For instance, flags on a draw command or predication in the rendering command buffer allows a single GPU to execute one or more commands in the corresponding command buffer, while the other GPUs will ignore the commands. For example, rendering command buffer 325*a* may support flags 330*a*, rendering command buffer 325*b* may support flags 330*b* . . . rendering command buffer 325*n* may support flags 330*n*.

Performance of synchronous compute (e.g. execution of synchronous compute kernels) and rendering of objects are part of the overall rendering. For example, if the video game is running at 60 Hz (e.g. 60 frames per second), then all object rendering and execution of synchronous compute kernels for an image frame typically must complete within approximately 16.67 ms (e.g. one frame at 60 Hz). As previously described, operations performed when rendering objects and/or executing synchronous compute kernels are ordered, such that operations may be dependent on other operations (e.g. commands in a rendering command buffer may need to complete execution before other commands in that rendering command buffer can execute).

In particular, each of the rendering command buffers 325 contains commands of various types, including commands that affect a corresponding GPU configuration (e.g. commands that specify the location and format of a render target), as well as commands to render objects and/or execute synchronous compute kernels. For purposes of illustration, synchronous compute performed when executing synchronize compute kernels may include performing full screen effects when the objects have all been rendered to one or more corresponding multiple render targets (MRTs).

In addition, when GPU resources 365 render objects for an image frame, and/or execute synchronous compute kernels when generating the image frame, the GPU resources 365 are configured via the registers of each GPU 365*a*, 365*b* . . . 365*n*. For example, GPU 365*a* is configured via its registers 340 (e.g. register 340*a*, register 340*b* . . . register 340*n*) to perform that rendering or compute kernel execution in a certain way. That is, the values stored in registers 340 define the hardware context (e.g. GPU configuration or GPU state) for GPU 365*a* when executing commands in rendering command buffers 325 used for rendering objects and/or executing synchronous compute kernels for an image frame. Each of the GPUs in GPU resources 365 may be similarly configured, such that GPU 365*b* is configured via its registers 350 (e.g., register 350*a*, register 350*b* . . . register 350*n*) to perform that rendering or compute kernel execution in a certain way; . . . and GPU 365*n* is configured via its registers 370 (e.g., register 370*a*, register 370*b* . . . register 370*n*) to perform that rendering or compute kernel execution in a certain way.

Some examples of GPU configuration include the location and format of render targets (e.g. MRTs). Also, other examples of GPU configuration include operating procedures. For instance, when rendering an object, the Z-value of each pixel of the object can be compared to the Z-buffer in various ways. For example, the object pixel is written only if the object Z-value matches the value in the Z-buffer. Alternatively, the object pixel could be written only if the object Z-value is the same or less than the value in the Z-buffer. The type of test being performed is defined within the GPU configuration.

Figure 4:
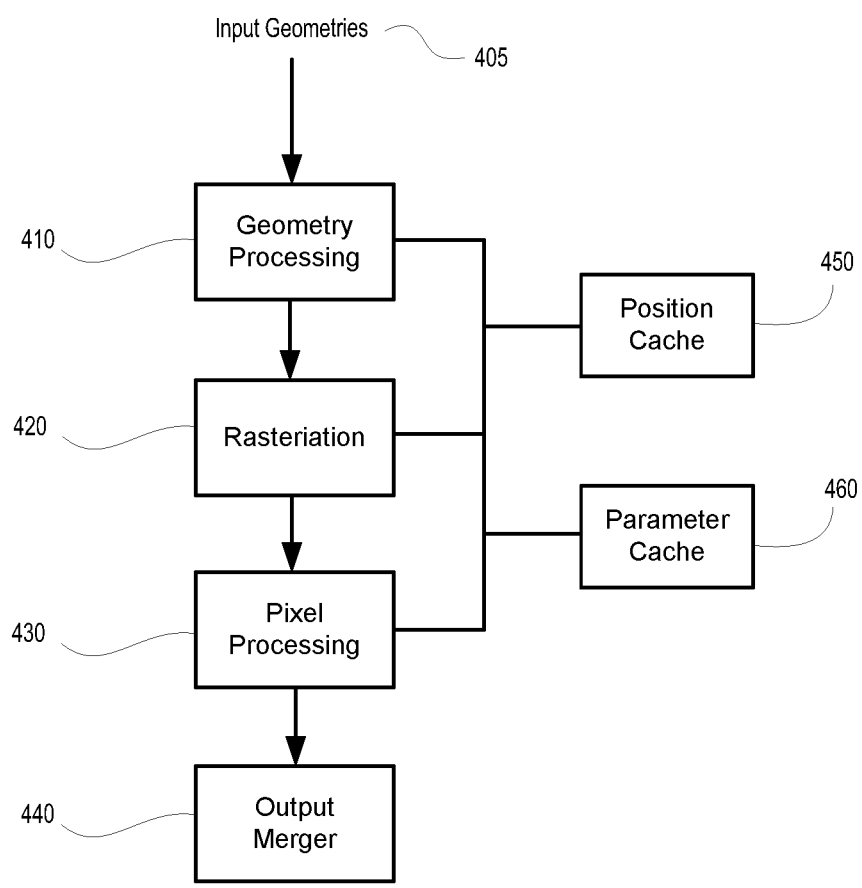
FIG. 4 is a diagram of a rendering architecture implementing a graphics pipeline that is configured for multi-GPU processing, such that multiple GPUs collaborate to render a single image, in accordance with one embodiment of the present disclosure.

FIG. 4 is a simplified diagram of a rendering architecture implementing a graphics pipeline 400 that is configured for multi-GPU processing, such that multiple GPUs collaborate to render a single image, in accordance with one embodiment of the present disclosure. The graphics pipeline 400 is illustrative of the general process for rendering images using 3D (three dimensional) polygon rendering processes. The graphics pipeline 400 for a rendered image outputs corresponding color information for each of the pixels in a display, wherein the color information may represent texture and shading (e.g., color, shadowing, etc.). Graphics pipeline 400 may be implementable within the client device 110, game server 160, game title processing engine 111, and/or GPU resources 365 of FIGS. 1 and 3. That is, various architectures may include multiple GPUs collaborating to render a single image by performing multi-GPU rendering of geometry for an application through region testing while rendering, such as implementing multi-GPU rendering of geometry between one or more cloud gaming servers of a cloud gaming system, or implementing multi-GPU rendering of geometry within a stand-alone system, such as a personal computer or gaming console that includes a high-end graphics card having multiple GPUs, etc.

As shown, the graphics pipeline receives input geometries 405. For example, the geometry processing stage 410 receives the input geometries 405. For example, the input geometries 405 may include vertices within a 3D gaming world, and information corresponding to each of the vertices. A given object within the gaming world can be represented using polygons (e.g., triangles) defined by vertices, wherein the surface of a corresponding polygon is then processed through the graphics pipeline 400 to achieve a final effect (e.g., color, texture, etc.). Vertex attributes may include normal (e.g., which direction is perpendicular to the geometry at that location), color (e.g., RGB—red, green, and blue triple, etc.), and texture coordinate/mapping information.

The geometry processing stage 410 is responsible for (and capable of) both vertex processing (e.g. via a vertex shader) and primitive processing. In particular, the geometry processing stage 410 may output sets of vertices that define primitives and deliver them to the next stage of the graphics pipeline 400, as well as positions (to be precise, homogeneous coordinates) and various other parameters for those vertices. The positions are placed in the position cache 450 for access by later shader stages. The other parameters are placed in the parameter cache 460, again for access by later shader stages.

Various operations may be performed by the geometry processing stage 410, such as performing lighting and shadowing calculations for the primitives and/or polygons. In one embodiment, as the geometry stage is capable of processing of primitives, it can perform backface culling, and/or clipping (e.g. testing against the view frustum), thereby reducing the load on downstream stages (e.g., rasterization stage 420, etc.). In another embodiment, the geometry stage may generate primitives (e.g. with functionality equivalent to a traditional geometry shader).

The primitives output by the geometry processing stage 410 are fed into the rasterization stage 420 that converts the primitives into a raster image composed of pixels. In particular, the rasterization stage 420 is configured to project objects in the scene to a two-dimensional (2D) image plane defined by the viewing location in the 3D gaming world (e.g., camera location, user eye location, etc.). At a simplistic level, the rasterization stage 420 looks at each primitive and determines which pixels are affected by the corresponding primitive. In particular, the rasterizer 420 partitions the primitives into pixel sized fragments, wherein each fragment corresponds to a pixel in the display. It is important to note that one or more fragments may contribute to the color of a corresponding pixel when displaying an image.

As previously described, additional operations may also be performed by the rasterization stage 420 such as clipping (identify and disregard fragments that are outside the viewing frustum) and culling (disregard fragments that are occluded by closer objects) to the viewing location. With reference to clipping, the geometry processing stage 410 and/or rasterization stage 420 may be configured to identify and disregard primitives that are outside the viewing frustum as defined by the viewing location in the gaming world.

The pixel processing stage 430 uses the parameters created by the geometry processing stage, as well as other data, to generate values such as the resulting color of the pixel. In particular, the pixel processing stage 430 at its core performs shading operations on the fragments to determine how the color and brightness of a primitive varies with available lighting. For example, pixel processing stage 430 may determine depth, color, normal and texture coordinates (e.g., texture details) for each fragment, and may further determine appropriate levels of light, darkness, and color for the fragments. In particular, pixel processing stage 430 calculates the traits of each fragment, including color and other attributes (e.g., z-depth for distance from the viewing location, and alpha values for transparency). In addition, the pixel processing stage 430 applies lighting effects to the fragments based on the available lighting affecting the corresponding fragments. Further, the pixel processing stage 430 may apply shadowing effects for each fragment.

The output of the pixel processing stage 430 includes processed fragments (e.g., texture and shading information) and is delivered to the output merger stage 440 in the next stage of the graphics pipeline 400. The output merger stage 440 generates a final color for the pixel, using the output of the pixel processing stage 430, as well as other data, such as a value already in memory. For example, the output merger stage 440 may perform optional blending of values between fragments and/or pixels determined from the pixel processing stage 430, and values already written to an MRT for that pixel.

Color values for each pixel in the display may be stored in a frame buffer (not shown). These values are scanned to the corresponding pixels when displaying a corresponding image of the scene. In particular, the display reads color values from the frame buffer for each pixel, row-by-row, from left-to-right or right-to-left, top-to-bottom or bottom-to-top, or any other pattern, and illuminates pixels using those pixel values when displaying the image.

Figure 5:
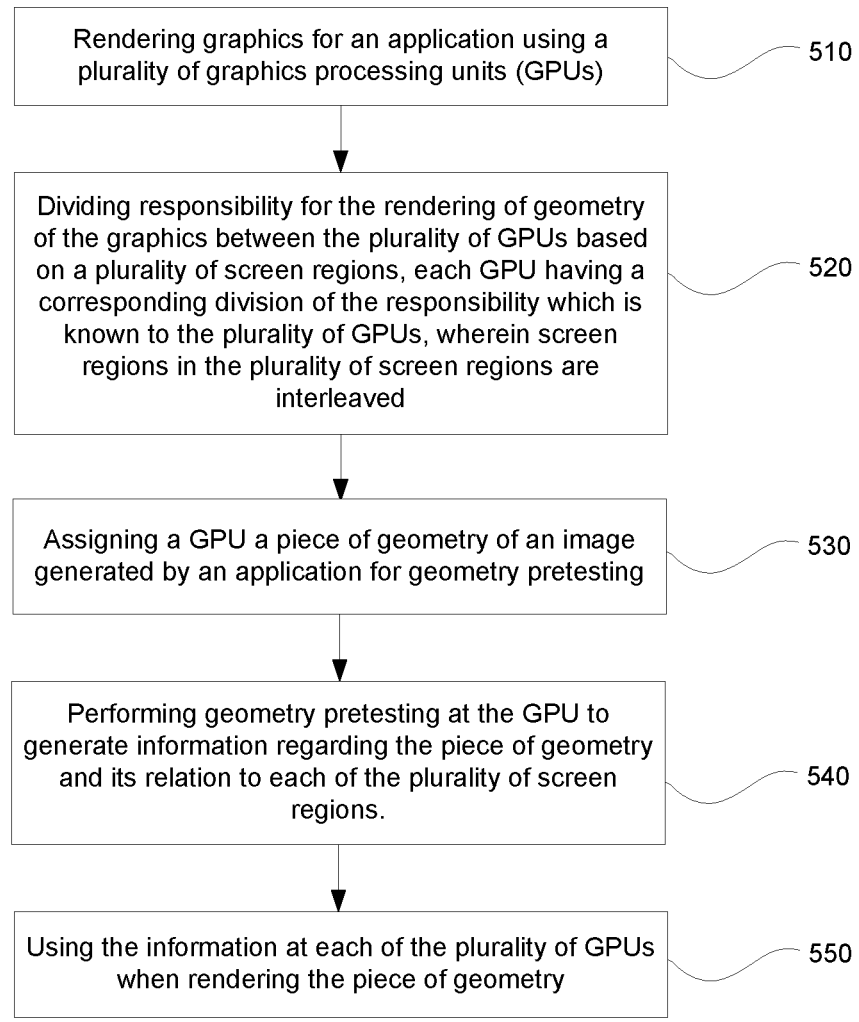
FIG. 5 is a flow diagram illustrating a method for graphics processing including multi-GPU rendering of geometry for an application by pretesting against interleaved screen regions before rendering, in accordance with one embodiment of the present disclosure.

With the detailed description of the cloud game network 190 (e.g. in the game server 160) and the GPU resources 365 of FIGS. 1-3, flow diagram 500 of FIG. 5 illustrates a method for graphics processing when implementing multi-GPU rendering of geometry for an image frame generated by an application by pretesting the geometry against interleaved screen regions before rendering, in accordance with one embodiment of the present disclosure. In that manner, multiple GPU resources are used to efficiently perform rendering of objects when executing an application. As previously described, various architectures may include multiple GPUs collaborating to render a single image by performing multi-GPU rendering of geometry for an application through region testing while rendering, such as within one or more cloud gaming servers of a cloud gaming system, or within a stand-alone system, such as a personal computer or gaming console that includes a high-end graphics card having multiple GPUs, etc.

At 510, the method includes rendering graphics for an application using a plurality of graphics processing units (GPUs) that collaborate to generate an image. In particular, multi-GPU processing is performed when rendering a single image frame and/or each of one or more image frames of a sequence of image frames for a real-time application.

At 520, the method includes dividing responsibility for the rendering geometry of the graphics between the plurality of GPUs based on a plurality of screen regions. That is, each GPU has a corresponding division of the responsibility (e.g., corresponding screen region) which is known to all the GPUs. More specifically, each of the GPUs is responsible for rendering geometry in a corresponding set of screen regions of the plurality of screen regions, wherein the corresponding set of screen regions includes one or more screen regions. For example, a first GPU has the first division of responsibility for rendering objects in a first set of screen regions. Also, a second GPU has a second division of responsibility for rendering objects in a second set of screen regions. This is repeatable for remaining GPUs.

At 530, the method includes assigning a first GPU a first piece of geometry of an image frame generated during execution an application for geometry testing. For example, an image frame may include one or more objects, wherein each object may be defined by one or more pieces of geometry. That is, geometry pretesting and rendering are performed on a piece of geometry that is an entire object, in one embodiment. In other embodiments, geometry pretesting and rendering are performed on a piece of geometry that is a portion of an entire object.

For example, each of the plurality of GPUs is assigned to a corresponding portion of the geometry associated with an image frame. In particular, every portion of the geometry is assigned to a corresponding GPU for purposes of geometry pretesting. The geometry may be evenly assigned between the plurality of GPUs, in one embodiment. For example, if there are four GPUs in the plurality, then each of the GPUs may process a quarter of the geometry in an image frame. In other embodiments, the geometry may be unevenly assigned between the plurality of GPUs. For example, in the example of using four GPUs for multi-GPU rendering of an image frame, one GPU may process more geometry of an image frame than another GPU.

At 540, the method includes performing geometry pretesting at the first GPU to generate information for how the piece of geometry relates to the plurality of screen regions. In particular, the first GPU generates information for the piece of geometry, and how it relates to each of the plurality of screen regions. For example, geometry pretesting by the first GPU may determine whether or not the piece of geometry overlaps a particular screen region that is assigned to a corresponding GPU for object rendering. The first piece of geometry may overlap screen regions for which other GPUs are responsible for object rendering, and/or may overlap screen regions for which the first GPU is responsible for object rendering. In one embodiment, the geometry testing is performed by shaders in a corresponding command buffer executed by the first GPU before performing rendering of the geometry by any of the plurality of GPUs. In other embodiments, the geometry testing is performed by hardware, e.g. in the rasterization stage 420 of the graphics pipeline 400.

Geometry pretesting is typically in embodiments performed simultaneously for all geometry of a corresponding image frame by the plurality of GPUs. That is, each GPU performs geometry pretesting for its portion of the geometry of a corresponding image frame. In that manner, geometry pretesting by the GPUs allows each GPU to know which pieces of geometry to render, and also which pieces of geometry to skip. In particular, when a corresponding GPU performs geometry pretesting, it tests its portion of the geometry against the screen regions of each of the plurality of GPUs used for rendering the image frame. For example, if there are four GPUs, then each GPU may perform geometry testing on a quarter of the geometry of the image frame, especially if the geometry is assigned evenly to the GPUs for purposes of geometry testing. As such, even though each GPU is only performing geometry pretesting for its portion of the geometry of a corresponding image frame, because geometry pretesting is typically in embodiments performed simultaneously for all geometry of the image frame across the plurality of GPUs, the information generated indicates how all the geometry (e.g. pieces of geometry) in the image frame relates to screen regions of all GPUs, wherein screen regions are each assigned to a corresponding GPU for object rendering, and/or wherein rendering may be performed on pieces of geometry (e.g. an entire object or a portion of an object).

At 550, the method includes using the information at each of the plurality of GPUs when rendering the piece of geometry (e.g. to include fully rendering the piece of geometry or skipping the rendering of that piece of geometry). That is, the information is used at each of the plurality of GPUs to render the piece of geometry, wherein test results (e.g. information) of the geometry are sent to other GPUs, such that the information is known to each of the GPUs. For example, the geometry (e.g. pieces of geometry) in the image frame is typically in embodiments rendered simultaneously by the plurality of GPUs. In particular, when a piece of geometry overlaps any screen region assigned to a corresponding GPU for object rendering, that GPU will render that piece of geometry based on the information. On the other hand, when the piece of geometry does not overlap any screen region assigned to the corresponding GPU for object rendering, that GPU can skip rendering of that piece of geometry based on the information. As such, the information allows all GPUs to more efficiently render geometry in an image frame, and/or to avoid rendering that geometry altogether. For example, the rendering may be performed by shaders in a corresponding command buffer as executed by the plurality of GPUs. As will be described more fully below in FIGS. 7A, 12A, and 13A, the shaders may be configured to perform one or both of geometry testing and/or rendering, based on corresponding GPU configurations.

In some architectures, if a corresponding rendering GPU receives corresponding information in time to use it, that GPU will use the information when deciding which geometry to render within a corresponding image, in accordance with one embodiment of the present disclosure. That is, the information may be taken as a hint. Otherwise, the rendering GPU will process the piece of geometry as it ordinarily would. Using the example wherein the information may indicate whether the geometry overlaps any screen region assigned to a rendering GPU (e.g. a second GPU), if the information indicates there is no overlapping of the geometry, the rendering GPU may skip rendering the geometry entirely. Also, if only pieces of the geometry do not overlap, the second GPU may skip rendering of at least those pieces of geometry that do not overlap any of the screen regions assigned to the second GPU for object rendering. On the other hand, the information may indicate that there is overlapping for the geometry, in which case the second or rendering GPU would render the geometry. Also, the information may indicate that certain pieces of the geometry overlap any of the screen regions assigned to the second or rendering GPU for object rendering. In that case, the second or rendering GPU would render only those pieces of the geometry that overlap. In still another embodiment, if there is no information, or if the information is not generated or received in time, the second GPU would perform rendering normally (e.g., render the geometry). As such, information provided as a hint may increase overall efficiency of the graphics processing system if received in time. If the information is not received in time, the graphics processing system will still operate properly in the absence of such information.

In one embodiment, one GPU (e.g. a pretest GPU) is dedicated to performing geometry pretesting to generate information. That is, the dedicated GPU is not used for rendering objects (e.g. pieces of geometry) in the corresponding image frame. Specifically, graphics for an application are rendered using a plurality of GPUs, as previously described. Responsibility for rendering geometry of the graphics is divided between the plurality of GPUs based on a plurality of screen regions, which may be interleaved, wherein each GPU has a corresponding division of the responsibility which is known to the plurality of GPUs. Geometry testing is performed at a pretest GPU on a plurality of pieces of geometry of an image frame generated by an application in order to generate information regarding each piece of geometry and its relation to each of the plurality of screen regions. The plurality of pieces of geometry are rendered at each of the plurality of GPUs using the information generated for each of the plurality of pieces of geometry. That is, the information is used when rendering each of the pieces of geometry by a corresponding rendering GPU from the GPUs used to render the image frame.

Figure 6A:
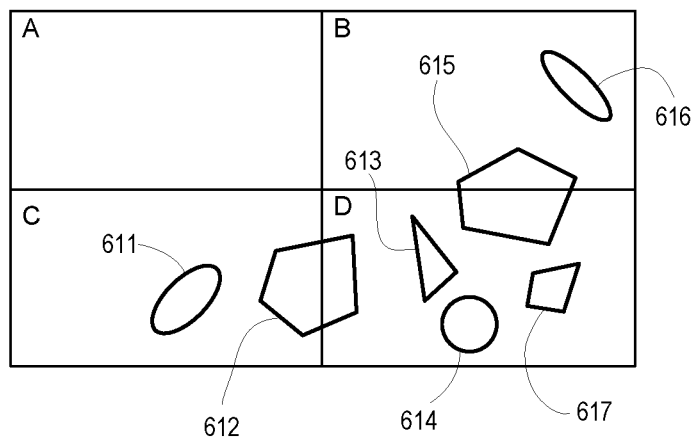
FIG. 6A is a diagram of a screen that is subdivided into quadrants when performing multi-GPU rendering, in accordance with one embodiment of the present disclosure.
Figure 6B:
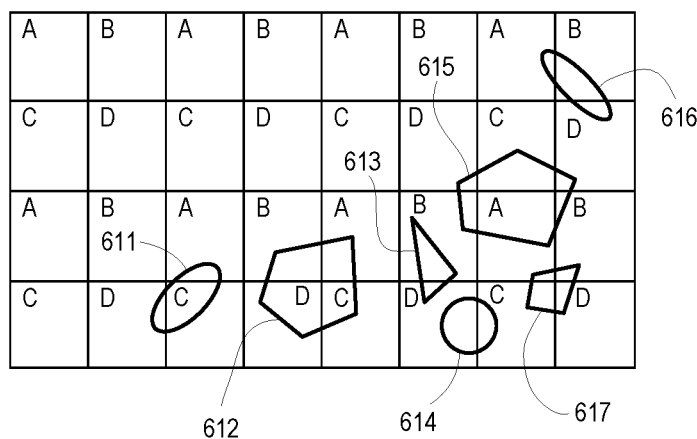
FIG. 6B is a diagram of a screen that is subdivided into a plurality of interleaved regions when performing multi-GPU rendering, in accordance with one embodiment of the present disclosure.

FIGS. 6A-6B show renderings to screens that are subdivided into regions and sub-regions, purely for purposes of illustration. It is understood that the number of subdivided regions and/or sub-regions is selectable for efficient multi-GPU processing of an image and/or each of one or more images of a sequence of images. That is, the screen may be subdivided into two or more regions, wherein each region may be further divided into sub-regions. In one embodiment of the present disclosure, the screen is subdivided into four quadrants as shown in FIG. 6A. In another embodiment of the present disclosure, the screen is subdivided into a larger number of interleaved regions as shown in FIG. 6B. The discussion of FIGS. 6A-6B below is intended to illustrate the inefficiencies that arise when performing multi-GPU rendering to a plurality of screen regions to which a plurality of GPUs are assigned; FIGS. 7A-7C and FIGS. 8A-8B show more efficient rendering, according to some embodiments of the invention.

In particular, FIG. 6A is a diagram of a screen 610A that is subdivided into quadrants (e.g. four regions) when performing multi-GPU rendering. As shown, screen 610A is subdivided into four quadrants (e.g. A, B, C, and D). Each quadrant is assigned to one of the four GPUs [GPU-A, GPU-B, GPU-C, and GPU-D], in a one-to-one relationship. For example, GPU-A is assigned to quadrant A, GPU-B is assigned to quadrant B, GPU-C is assigned to quadrant C, and GPU-D is assigned to quadrant D.

The geometry can be culled. For example, CPU 163 can check a bounding box against each quadrant's frustum, and request each GPU to render only the objects that overlap its corresponding frustum. The result is that each GPU is responsible for rendering only a portion of the geometry. For purposes of illustration, screen 610 shows pieces of geometry, wherein each piece is a corresponding object, wherein screen 610 shows objects 611-617 (e.g. pieces of geometry). GPU-A will render no objects, as no objects overlap Quadrant A. GPU-B will render objects 615 and 616 (as a portion of object 615 is present in Quadrant B, the CPU's culling test will correctly conclude that GPU-B must render it). GPU-C will render objects 611 and 612. GPU-D will render objects 612, 613, 614, 615 and 617.

In FIG. 6A, when the screen 610A is divided into quadrants A-D, the amount of work that each GPU must perform may be very different, as a disproportionate amount of geometry may be in one quadrant in some situations. For example, quadrant A does not have any pieces of geometry, whereas quadrant D has five pieces of geometry, or at least portions of at least five pieces of geometry. As such, GPU-A assigned to quadrant A would be idle, while GPU-D assigned to quadrant D would be disproportionately busy when rendering objects in the corresponding image.

FIG. 6B illustrates another technique when subdividing a screen into regions. In particular, rather than subdividing into quadrants, screen 610B is subdivided into a plurality of interleaved regions when performing multi-GPU rendering of a single image or each of one or more images in a sequence of images. In that case, screen 610B is subdivided into a larger number of interleaved regions (e.g. greater than the four quadrants), while using the same amount of GPUs for rendering (e.g. four). The objects (611-617) shown in screen 610A are also shown in screen 610B in the same corresponding locations.

In particular, four GPUs (e.g. GPU-A, GPU-B, GPU-C, and GPU-D) are used to render an image for a corresponding application. Each of the GPUs is responsible for rendering geometry overlapping a corresponding region. That is, each GPU is assigned to a corresponding set of regions. For example, GPU-A is responsible for each of the regions labeled A in a corresponding set, GPU-B is responsible for each of regions labeled B in a corresponding set, GPU-C is responsible for each of regions labeled C in a corresponding set, and GPU-D is responsible for each of regions labeled D in a corresponding set.

Further, the regions are interleaved in a particular pattern. Because of the interleaving (and higher number) of regions, the amount of work that each GPU must perform may be much more balanced. For example, the pattern of interleaving of screen 610B includes alternating rows including regions A-B-A-B and so on, and regions C-D-C-D and so on. Other patterns of interleaving the regions is supported in embodiments of the present disclosure. For example, patterns may include repeated sequences of regions, evenly distributed regions, uneven distribution of regions, repeatable rows of sequences of regions, random sequences of regions, random rows of sequences of regions, etc.

Choosing the number of regions is important. For example, if the distribution of regions is too fine (e.g. the number of regions is too great to be optimal), each GPU must still process most or all of the geometry. For example, it may be difficult to check object bounding boxes against all of the regions that a GPU is responsible for. Also, even if bounding boxes can be checked in a timely manner, due to small regions size, the result will be that each GPU likely has to process most of the geometry because every object in an image overlaps at least one of the regions of each of the GPUs (e.g. a GPU processes an entire object even though only a portion of the object overlaps at least one region in a set of regions assigned to that GPU).

As a result, choosing the number of regions, the pattern of interleaving, etc. is important. Choosing too few or too many regions, or too few regions or too many regions for interleaving, or choosing an inefficient pattern for interleaving may lead to inefficiencies when performing GPU processing (e.g. each GPU processing most or all of the geometry). In those cases, even though there are multiple GPUs for rendering an image, due to GPU inefficiencies, there is not the ability to support a corresponding increase in both screen pixel count and density of geometry (i.e. four GPUs can't write four times the pixels and process four times the vertices or primitives). The following embodiments target improvements in culling strategy (FIGS. 7A-7C) and granularity of culling (FIGS. 8A-8B), among other advances.

Figure 7A:
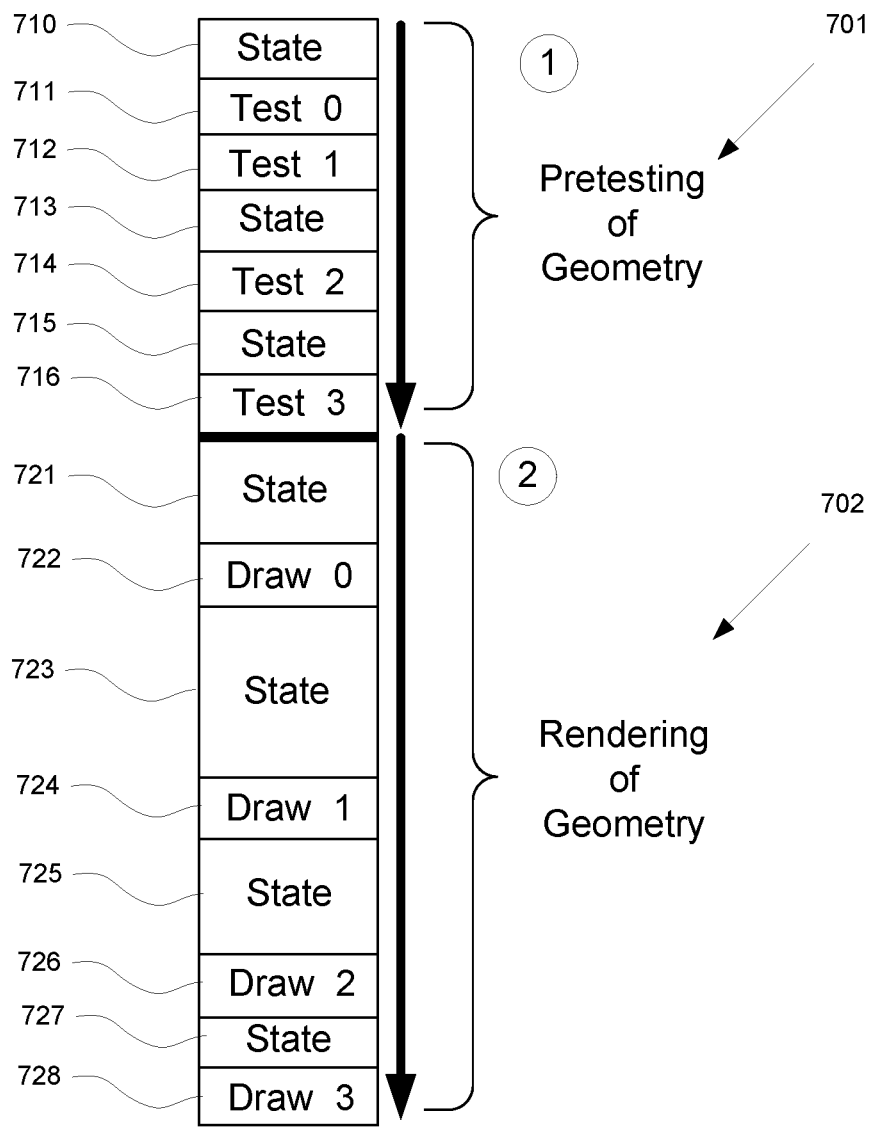
FIG. 7A is a diagram of a rendering command buffer that is shared by multiple GPUs that collaborate to render a single image frame including a pretesting of geometry portion and a rendering portion, in accordance with one embodiment of the present disclosure.
Figures 1, 2, 7B:
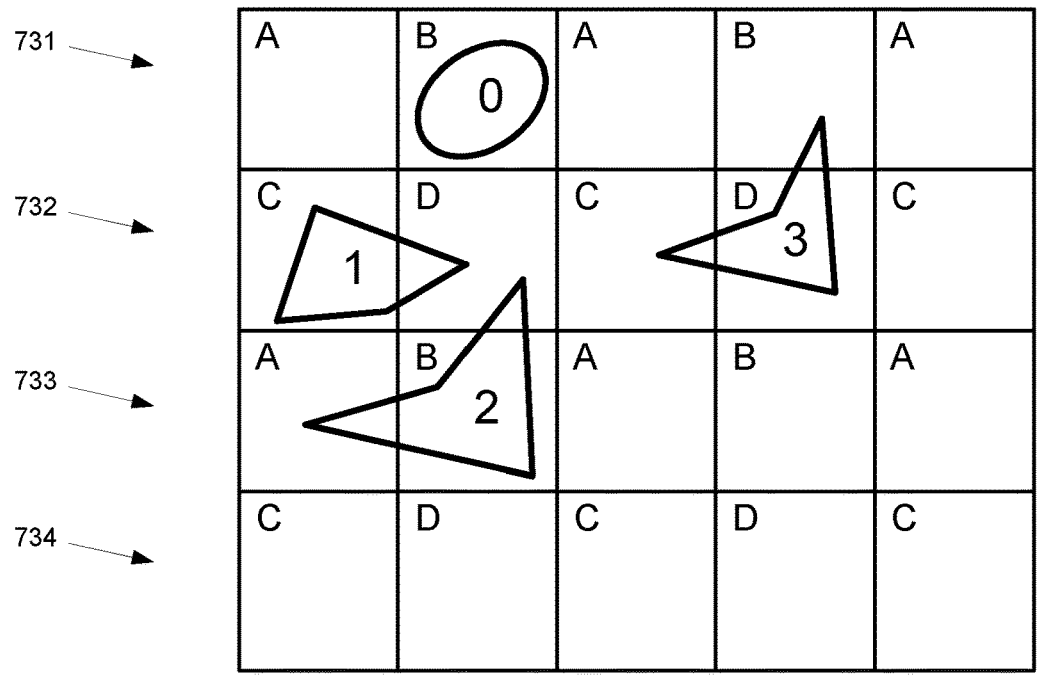
Figure 7C:
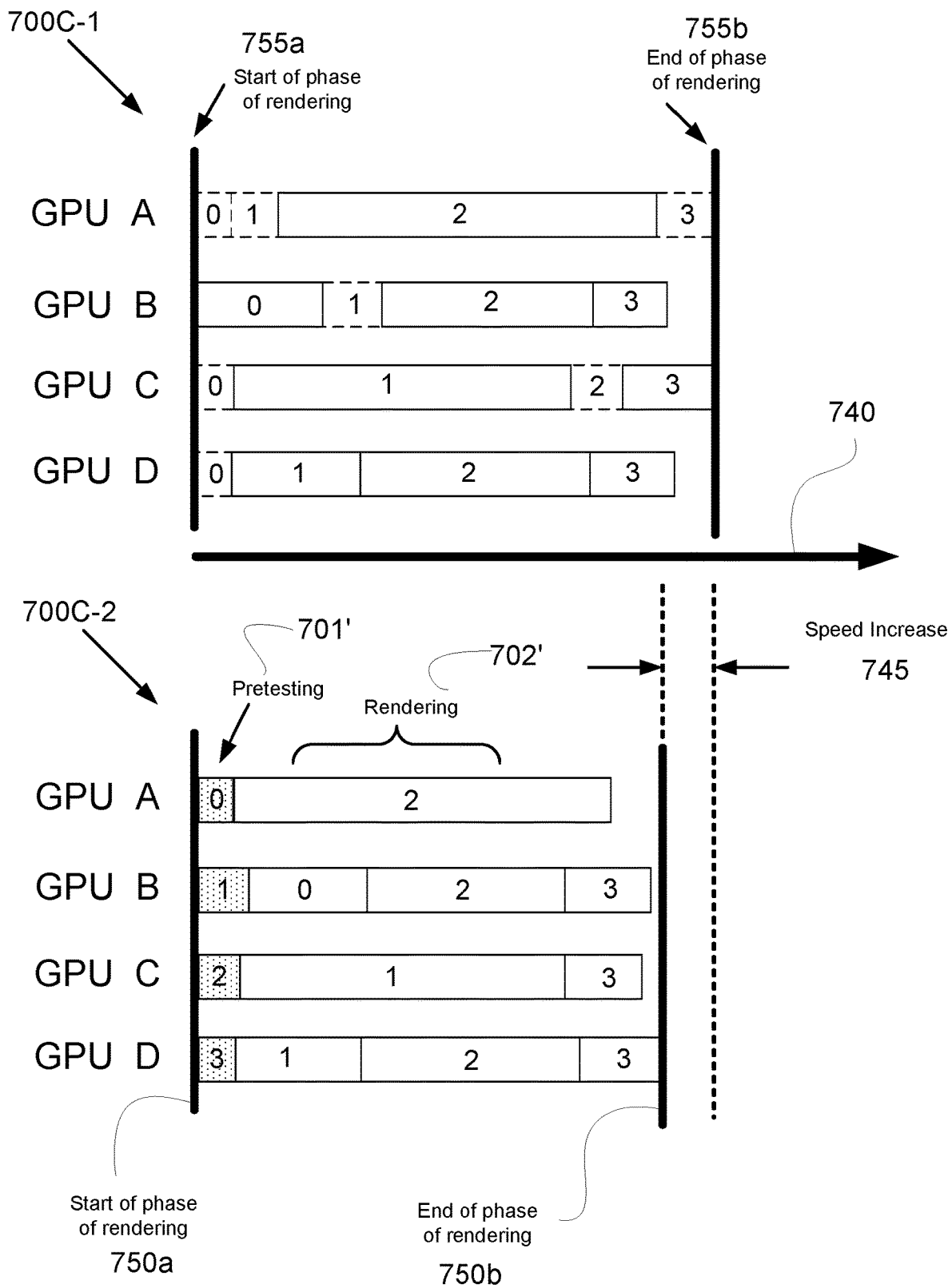
FIG. 7C is a diagram illustrating the performing of pretesting geometry and rendering of the geometry as performed by one or more GPUs when rendering an image frame through collaboration of multiple GPUs (e.g., the image of FIG. 7B-1), in accordance with one embodiment of the present disclosure.

FIGS. 7A-7C are diagrams illustrating the use of multiple GPUs to render a single image, and/or each of at least one or more images in a sequence of images, in embodiments of the present disclosure. The selection of four GPUs is made purely for ease of illustrating multi-GPU rendering when rendering an image while executing an application, and it is understood that any number of GPUs may be used for multi-GPU rendering in various embodiments.

In particular, FIG. 7A is a diagram of a rendering command buffer 700A that is shared by multiple GPUs that collaborate to render a single image frame, in accordance with one embodiment of the present disclosure. That is, in the present example the multiple GPUs each use the same rendering command buffer (e.g., buffer 700A), and each of the GPUs execute all commands in the rendering command buffer. A plurality of commands (complete set) is loaded into rendering command buffer 700A, and is used for rendering a corresponding image frame. It is understood that one or more rendering command buffers may be used to generate a corresponding image frame. In one example, the CPU generates one or more draw calls for the image frame, wherein the draw calls include commands placed into one or more rendering command buffers for execution by one or more GPUs of the GPU resources 365 of FIG. 3 when performing multi-GPU rendering of a corresponding image. In some implementations, the CPU 163 may request one or more GPUs to generate all or some of the draw calls used for rendering a corresponding image. Further, the entire set of commands may be shown in FIG. 7A that are contained within the rendering command buffer 700A, or FIG. 7A may show a portion of the entire set of commands contained within the rendering command buffer 700A.

GPUs typically in embodiments render simultaneously when performing multi-GPU rendering of an image or each of one or more images in a sequence of images. Rendering of an image can be broken down into multiple phases. In each of the phases, the GPUs need to be synchronized, such that a faster GPU must wait until the slower GPUs complete. The commands shown in FIG. 7A for the rendering command buffer 700A shows one phase. Though commands for only one phase is shown in FIG. 7A, the rendering command buffer 700A may include commands for one or more phases when rendering an image, FIG. 7A only shows a portion of all the commands, such that commands for the other phases are not shown. In the piece of the rendering command buffer 700A shown in FIG. 7A that illustrates one phase, there are four objects to be rendered (e.g., object 0, object 1, object 2, and object 3), as is shown in FIG. 7B-1.

As shown, the piece of the rendering command buffer 700A shown in FIG. 7A includes commands for geometry testing, rendering of objects (e.g. pieces of geometry) and commands for configuring state of the one or more rendering GPUs that are executing commands from rendering command buffer 700A. For purposes of illustration only, the piece of rendering command buffer 700A shown in FIG. 7A includes commands (710-728) used for geometry pretesting, rendering objects and/or executing synchronous compute kernels when rendering a corresponding image for a corresponding application. In some implementations, the geometry pretesting, and rendering of objects for that image and/or the execution of synchronous compute kernels must be performed within a frame period. Two processing sections are shown in the rendering command buffer 700A. In particular, processing section 1 includes pretesting or geometry testing 701, and section 2 includes rendering 702.

Section 1 includes performing geometry testing 701 of objects in the image frame, wherein each object may be defined by one or more pieces of geometry. Pretesting or geometry testing 701 may be performed by one or more shaders. For example, each GPU used in multi-GPU rendering of a corresponding image frame is assigned a portion of the geometry of the image frame to perform geometry testing, wherein every portion may be assigned for pretesting, in one embodiment. The assigned portion may include one or more pieces of geometry, wherein a piece may include an entire object, or may include a portion of an object (e.g., vertex, primitive, etc.). In particular, geometry testing is performed on a piece of geometry to generate information on how that piece of geometry relates to each of the plurality of screen regions. For example, geometry testing may determine whether a piece of geometry overlaps a particular screen region assigned to a corresponding GPU for object rendering.

As shown in FIG. 7A, geometry testing 701 (e.g., pretesting of geometry) of section 1 includes commands for configuring a state of the one or more GPUs executing commands from the rendering command buffer 700A, and commands for performing geometry testing. In particular, the GPU state of each GPU is configured before the GPUs perform geometry testing on corresponding objects. For example, commands 710, 713, and 715 are each used for configuring a GPU state of the one or more GPUs for purposes of executing commands for geometry testing. As shown, command 710 configures GPU state so that geometry testing commands 711-712 can be properly performed, wherein command 711 performs geometry testing on object 0, and command 712 performs geometry testing on object 1. Similarly, command 713 configures GPU state so that geometry testing command 714 can perform geometry testing for object 2. Also, command 715 configures GPU state so that geometry testing command 716 can perform geometry testing for object 3. It is understood that a GPU state may be configured for one or more geometry testing commands (e.g., testing commands 711 and 712).

As previously described, values stored in the registers define the hardware context (e.g. GPU configuration) for the corresponding GPU when executing commands in the rendering command buffer 700A used for geometry testing and/or rendering objects and/or executing synchronous compute kernels for a corresponding image. As shown, the GPU state may be modified throughout the processing of commands in the rendering command buffer 700A, each subsequent section of commands may be used for configuring the GPU state. As applied to FIG. 7A, as well as throughout the specification when referring to setting GPU state, the GPU state may be set in a variety of ways. For example, the CPU or GPU could set a value in random access memory (RAM), wherein the GPU would check the value in RAM. In another example, the state could be internal to the GPU, such as when a command buffer is called as a subroutine twice with internal GPU state being different between the two subroutine calls.

Section 2 includes performing rendering 702 of objects in the image frame, wherein pieces of geometry are rendered). Rendering 702 may be performed by one or more shaders in the command buffer 700A. As shown in FIG. 7A, rendering 702 of section 2 includes commands for configuring a state of the one or more GPUs executing commands from the rendering command buffer 700A, and commands for performing the rendering. In particular, the GPU state of each GPU is configured before the GPUs render corresponding objects (e.g. pieces of geometry). For example, commands 721, 723, 725, and 727 are each used for configuring a GPU state of the one or more GPUs for purposes of executing commands for rendering. As shown, command 721 configures GPU state so that rendering command 722 can render object 0; command 723 configures GPU state so that rendering command 724 can render object 1; command 725 configures GPU state so that rendering command 726 can render object 2; and command 727 configures GPU state so that rendering command 728 can render object 3. Though FIG. 7A shows that GPU state is configured for each rendering command (e.g., render object 0, etc.), it is understood that a GPU state may be configured for one or more rendering commands.

As previously described, each GPU used in multi-GPU rendering of a corresponding image frame renders corresponding pieces of geometry based on the information generated during geometry pretesting. Specifically, the information known to each of the GPUs provides relationships between objects and screen regions. When rendering corresponding pieces of geometry, a GPU may use that information if received in a timely fashion for purposes of efficiently rendering those pieces of geometry. Specifically, as indicated by the information, when a piece of geometry overlaps any screen region or regions assigned to a corresponding GPU for object rendering, that GPU performs rendering for that piece of geometry. On the other hand, the information may indicate that a first GPU should skip rendering a piece of geometry entirely (e.g., the piece of geometry does not overlap any screen region that the first GPU is assigned responsibility for object rendering). In that manner, each GPU only renders pieces of geometry that overlap the screen region or regions to which it is responsible for object rendering. As such, the information is provided as a hint to each of the GPUs, such that the information is considered by each GPU that is performing rendering pieces of geometry if received before rendering begins. In one embodiment, rendering proceeds normally if the information is not received in time, such as the corresponding piece of geometry is rendered fully by a corresponding GPU regardless of whether that piece of geometry overlaps any screen regions that are assigned to the GPU for object rendering.

For purposes of illustration only, four GPUs are dividing up a corresponding screen into regions between them. As previously described, each GPU is responsible for rendering objects in a corresponding set of regions, wherein the corresponding set includes one or more regions. In one embodiment, rendering command buffer 700A is shared by multiple GPUs that collaborate to render a single image. That is, the GPUs used for multi-GPU rendering of a single image or each of one or more images in a sequence of images share a common command buffer. In another embodiment, each GPU might have its own command buffer.

Alternatively, in still another embodiment each of the GPUs might be rendering somewhat different sets of objects. This may be the case when it can be determined that a specific GPU does not need to render a specific object because it does not overlap its corresponding screen regions, such as in a corresponding set. The multiple GPUs can still use the same command buffer (e.g., sharing one command buffer), as long as the command buffer supports the ability for a command to be executed by one GPU but not by another, as previously described. For example, execution of a command in the shared rendering command buffer 700A may be limited to one of the rendering GPUs. This could be accomplished in a variety of ways. In another example, flags may be used on a corresponding command to indicate which GPUs should execute it. Also, predication may be implemented in the rendering command buffer using bits to say which GPU does what under which condition. An example of predication includes—"If this is GPU-A, then skip the following X commands".

In still another embodiment, as substantially the same set of objects is being rendered by each GPU, the multiple GPUs may still use the same command buffer. For example, when the regions are relatively small, each GPU may still render all of the objects, as previously described.

FIG. 7B-1 illustrates a screen 700B showing an image including four objects that are rendered by multiple GPUs using the rendering command buffer 700A of FIG. 7A, in accordance with one embodiment of the present disclosure. Multi-GPU rendering of geometry is performed for an application by pretesting the geometry against screen regions, which may be interleaved, before rendering pieces of geometry corresponding to objects in an image frame, in accordance with one embodiment of the present disclosure.

In particular, responsibility for rendering of geometry is divided up by screen region between the multiple GPUs, wherein the plurality of screen regions is configured to reduce imbalance of rendering time between the plurality of GPUs. For example, screen 700B shows the screen region responsibilities for each GPU when rendering the objects of the image. Four GPUs (GPU-A, GPU-B, GPU-C, and GPU-D) are used for rendering objects in the image shown in screen 700B. Screen 700B is divided more finely than by quadrants as shown in FIG. 6A, in an effort to balance pixel and vertex load between the GPUs. In addition, screen 700B is divided into regions, that may be interleaved. For example, the interleaving includes multiple rows of regions. Each of rows 731 and 733 includes region A alternating with region B. Each of rows 732 and 734 includes region C alternating with region D. More particularly, rows including regions A and B alternate with rows including regions C and D, in a pattern.

As previously described, to achieve GPU processing efficiency various techniques may be used when dividing the screen into regions, such as increasing or decreasing the number of regions (e.g., to choose the correct amount of regions), interleaving regions, increasing or decreasing the number of regions for interleaving, selecting a particular pattern when interleaving regions and/or sub-regions, etc. In one embodiment, each of the plurality of screen regions is uniformly sized. In one embodiment, each of the plurality of screen regions is not uniform in size. In still another embodiment, the number and sizing of a plurality of screen regions changes dynamically.

Each of the GPUs is responsible for rendering of objects in a corresponding set of regions, wherein each set may include one or more regions. As such, GPU-A is responsible for rendering of objects in each of the A regions in a corresponding set, GPU-B is responsible for rendering of objects in each of the B regions in a corresponding set, GPU-C is responsible for rendering of objects in each of the C regions in a corresponding set, and GPU-D is responsible for rendering of objects in each of the D regions in a corresponding set. There might also be GPUs that have other responsibilities, such that they may not perform rendering (e.g., perform asynchronous compute kernels that execute over multiple frame periods, perform culling for the rendering GPUs, etc.).

The amount of rendering to be performed is different for each GPU. FIG. 7B-2 illustrates a table showing the rendering performed by each GPU when rendering the four objects of FIG. 7B-1, in accordance with one embodiment of the present disclosure. As shown in the table, after geometry pretesting, it may be determined that object 0 is rendered by GPU-B; that object 1 is rendered by GPU-C and GPU-D; that object 2 is rendered by GPU-A, GPU-B, and GPU-D; and that object 3 is rendered by GPU-B, GPU-C, and GPU-D. There may still be some unbalanced rendering, as GPU A needs to render object 2 only, and GPU D needs to render objects 1, 2 and 3. However, overall, with interleaving of screen regions, the rendering of objects within an image is reasonably balanced across the multiple GPUs used for multi-GPU rendering of an image, or rendering of each of one or more images in a sequence of images.

FIG. 7C is a diagram illustrating the rendering of each object as performed by each GPU when multiple GPUs collaborate to render a single image frame, such as the image frame 700B shown in FIG. 7B-1, in accordance with one embodiment of the present disclosure. In particular, FIG. 7C shows the rendering process of objects 0-3 as performed by each of the four GPUs (e.g., GPU-A, GPU-B, GPU-C, and GPU-D) using the shared rendering command buffer 700A of FIG. 7A.

In particular, two rendering timing diagrams are shown with respect to a timeline 740. Rendering timing diagram 700C-1 shows multi-GPU rendering of objects 0-3 of a corresponding image in one phase of rendering, wherein each of the GPUs perform rendering in the absence of any information regarding the overlap between objects 0-3 and the screen regions. Rendering timing diagram 700C-2 shows multi-GPU rendering of objects 0-3 of the corresponding image in the same phase of rendering, wherein information generated during geometry testing of screen regions (e.g. performed before rendering) are shared with each of the GPUs used for rendering objects 0-3 through a corresponding GPU pipeline. Each of rendering timing diagrams 700C-1 and 700C-2 show the time taken by each GPU to process each piece of geometry (e.g., perform geometry testing and rendering). In one embodiment, a piece of geometry is an entire object. In another embodiment, a piece of geometry may be a portion of an object. For purposes of illustration, the example of FIG. 7C shows the rendering of pieces of geometry, wherein each piece of geometry corresponds to an object (e.g. in its entirety). In each of the rendering timing diagrams 700C-1 and 700C-2 objects (e.g. pieces of geometry) that have no geometry (e.g. a primitive of the object) that overlaps at least one screen region (e.g. in a corresponding set of regions) of a corresponding GPU are represented by boxes drawn with dashed lines. On the other hand, objects that have geometry that overlaps at least one screen region (e.g. in a corresponding set of regions) of a corresponding GPU are represented by boxes drawn with solid lines.

Rendering timing diagram 700C-1 shows rendering of objects 0-3 using the four GPUs (e.g. GPU-A, GPU-B, GPU-C, and GPU-D). Vertical line 755*a* indicates the start of the phase of rendering for the objects, and vertical line 755*b* shows the end of the phase of rendering for the objects in rendering timing diagram 700C-1. The start and end points along timeline 740 for the phase of rendering shown represent synchronization points, wherein each of the four GPUs are synchronized when executing a corresponding GPU pipeline. For instance, at vertical line 755*b* indicating the end of the phase of rendering, all GPUs must wait for the slowest GPU (e.g. GPU-B) to finish rendering objects 0-3 through the corresponding graphics pipeline before moving to the next phase of rendering.

Geometry pretesting is not performed in rendering timing diagram 700C-1. As such, each of the GPUs must process each of the objects through the corresponding graphics pipeline. A GPU may not fully render an object through the graphics pipeline if there are no pixels to be drawn for the object in any region assigned (e.g. in a corresponding set) to the corresponding GPU for object rendering. For example, when an object does not overlap, only the geometry processing stage of the graphics pipeline is executed. However, this still takes some time for processing.

In particular, GPU-A does not fully render objects 0, 1, and 3, because they do not overlap any screen regions (e.g. in a corresponding set) assigned to GPU-A for object rendering. The rendering of these three objects is shown in boxes with dashed lines indicating that at least the geometry processing stage is performed, but the graphics pipeline is not fully performed. GPU-A fully renders object 2 because that object overlaps at least one screen region assigned to GPU-A for rendering. The rendering of object 2 is shown in a box with solid lines indicating that all of the stages of the corresponding graphics pipeline are performed. Similarly, GPU-B does not fully render object 1 (shown with a box with dashed lines) (i.e. performing at least geometry processing stage), but fully renders objects 0, 2, and 3 (shown with boxes with solid lines) because those objects overlap at least one screen region (e.g. in a corresponding set) assigned to GPU-B for rendering. Also, GPU-C does not fully render objects 0 and 2 (shown with boxes with dashed lines) (i.e. performing at least geometry processing stage), but fully renders objects (shown with boxes with solid lines) because those objects overlap at least one screen region (e.g. in a corresponding set) assigned to GPU-C for rendering. Further, GPU-D does not fully render object 0 (shown with a box with dashed lines) (i.e. performing at least geometry processing stage), but fully renders objects 1, 2, and 3 (shown with boxes with solid lines) because those objects overlap at least one screen region (e.g. in a corresponding set) assigned to GPU-D for rendering.

Rendering timing diagram 700C-2 shows geometry pretesting 701' and rendering 702' of objects 0-3 using multiple GPUs. Vertical line 750*a* indicates the start of the phase of rendering (e.g. including geometry pretesting and rendering) for the objects, and vertical line 750*b* shows the end of the phase of rendering for the objects in rendering timing diagram 700C-2. The start and end points along timeline 740 for the phase of rendering shown in timing diagram 700C-2 represent synchronization points, wherein each of the four GPUs are synchronized when executing a corresponding GPU pipeline, as previously described. For instance, at vertical line 750*b* indicating the end of the phase of rendering, all GPUs must wait for the slowest GPU (e.g. GPU-B) to finish rendering objects 0-3 through the corresponding graphics pipeline before moving to the next phase of rendering.

First, geometry pretesting 701' is performed by the GPUs, wherein each GPU performs geometry pretesting for a subset of the geometry of the image frame against all the screen regions, wherein each screen region is assigned to a corresponding GPU for object rendering. As previously described, each of the GPUs is assigned to a corresponding portion of the geometry associated with the image frame. Geometry pretesting generates information about how a particular piece of geometry relates to each of the screen regions, such as whether or not a piece of geometry overlaps any screen regions (e.g. in a corresponding set) assigned to a corresponding GPU for object rendering. That information is shared with each of the GPUs used for rendering the image frame. For example, geometry pretesting 701' shown in FIG. 7C includes having GPU-A perform geometry pretesting for object 0, having GPU-B perform geometry pretesting for object 1, having GPU-C perform geometry pretesting for object 2, and having GPU-D perform geometry pretesting for object 3. Depending on the object being tested, the time for performing geometry pretesting may vary. For example, geometry pretesting of object 0 takes less time than to perform geometry pretesting on object 1. This may be due to object sizing, the number of screen regions that are overlapped, etc.

After geometry pretesting, each GPU performs rendering for all objects or pieces of geometry that intersect their screen regions. In one embodiment, each GPU begins the rendering of its pieces of geometry as soon as geometry testing is finished. That is, there is no synchronization point between the geometry testing and the rendering. This is possible because the geometry testing information being generated is treated as a hint rather than a hard dependency. For example, GPU-A begins rendering object 2 before GPU-B has finished geometry pretesting object 1, and as such before GPU-B begins rendering objects 0, 2, and 3.

Vertical line 750*a* is aligned with vertical line 755*a*, such that each of the rendering timing diagrams 700C-1 and 700C-2 begin at the same time to render objects 0-3. However, the rendering of objects 0-3 shown in rendering timing diagram 700C-2 is performed in less time than the rendering shown in rendering timing diagram 700C-1. That is, vertical line 750*b* indicating the end of phase of rendering for the lower timing diagram 700C-2 occurs earlier than the end of phase of rendering for the upper timing diagram 700C-1 as indicated by vertical line 755*b*. Specifically, a speed increase 745 when rendering objects 0-3 is realized when performing multi-GPU rendering of geometry of an image for an application including pretesting geometry against screen regions before rendering, and providing the results of the geometry pretesting as information (e.g. hints). As shown, speed increase 745 is the time difference between vertical line 750*b* of timing diagram 700C-2 and vertical line 755*b* of timing diagram 700C-1.

The speed increase is realized through the generation and sharing of information generated during geometry pretesting. For example, during geometry pretesting GPU-A generates information indicating that object 0 need only be rendered by GPU-B. As such, GPU-B is informed that it should render object 0, and the other GPUs (e.g. GPU-A, GPU-C, and GPU-D) may skip rendering of object 0 entirely, as object 0 does not overlap any regions (e.g. in corresponding sets) assigned to those GPUs for object rendering. For example, these GPUs need not perform the geometry processing stage, whereas without geometry pretesting this stage was processed even though these GPUs would not fully render object 0, as is shown in timing diagram 700C-1. Also, during geometry pretesting GPU-B generates information indicating that object 1 should be rendered by GPU-C and GPU-D, and that GPU-A and GPU-B may skip rendering of object 1 entirely, as object 1 does not overlap any region (e.g. in respective corresponding sets) assigned to GPU-A or GPU-B for object rendering. Also, during geometry pretesting GPU-C generates information indicating that object 2 should be rendered by GPU-A, GPU-B, and GPU-D, and that GPU-C may skip rendering of object 2 entirely, as object 2 does not overlap any region (e.g. in a corresponding set) assigned to GPU-C for object rendering. Further, during geometry pretesting GPU-D generates information indicating that object 3 should be rendered by GPU-B, GPU-C, and GPU-D, and that GPU-A may skip rendering of object 3 entirely, as object 3 does not overlap any region (e.g. in a corresponding set) assigned to GPU-A for object rendering.

Because the information generated from geometry pretesting is shared between the GPUs, each GPU can determine which objects to render. As such, after geometry pretesting is performed and results from the testing is shared with all the GPUs, then each GPU has information with regards to which objects or pieces of geometry need to be rendered by the corresponding GPU. For example, GPU-A renders object 2; GPU-B renders objects 0, 2, and 3; GPU-C renders objects 1 and 3; and GPU-D renders objects 1, 2, and 3.

In particular, GPU A performs geometry processing for object 1, and determines that object 1 can be skipped by GPU-B, as object 1 does not overlap any region (e.g. in a corresponding set) assigned to GPU-B for object rendering. In addition, object 1 is not fully rendered by GPU-A, as it does not overlap any region (e.g. in a corresponding set) assigned to GPU-A for object rendering. Since the determination that there is no overlap of object 1 by any region assigned to GPU-B is made before GPU-B begins geometry processing for object 1, GPU-B skips the rendering of object 1.

Figure 8A:
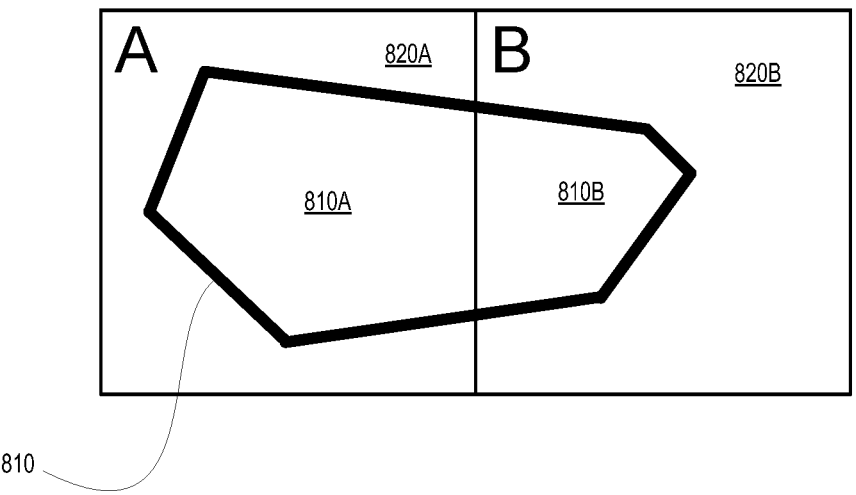
FIG. 8A illustrates object testing against screen regions when multiple GPUs collaborate to render a single image, in accordance with one embodiment of the present disclosure.
Figure 8B:
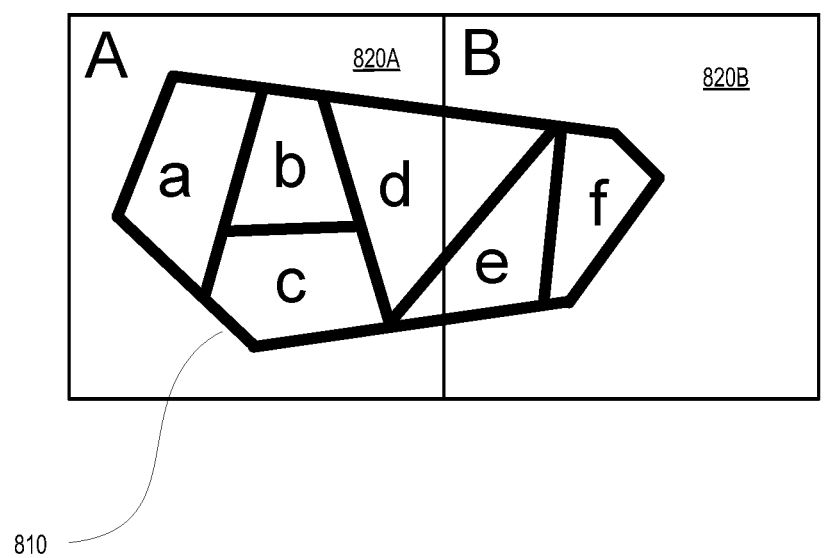
FIG. 8B illustrates testing of portions of an object against screen regions when multiple GPUs collaborate to render a single image, in accordance with one embodiment of the present disclosure.

FIGS. 8A-8B show object testing against screen regions 820A and 820B, wherein the screen regions may be interleaved (e.g. screen regions 820A and 820B show a portion of a display). In particular, multi-GPU rendering of objects is performed for a single image frame, or each of one or more image frames in a sequence of image frames by performing geometry testing before rendering objects in the screen. As shown, GPU-A is assigned responsibility for rendering objects in screen region 820A. GPU-B is assigned responsibility for rendering objects in screen region 820B. Information is generated for "pieces of geometry," wherein the pieces of geometry can be an entire object or portions of objects. For example, a piece of geometry can be an object 810, or portions of object 810.

FIG. 8A illustrates object testing against screen regions when multiple GPUs collaborate to render a single image, in accordance with one embodiment of the present disclosure. As previously described, the pieces of geometry can be objects, such that the pieces correspond to the geometry used by or generated by a corresponding draw call. During geometry pretesting, object 810 may be determined to overlap region 820A. That is, portion 810A of object 810 overlaps region 820A. In that case, GPU-A is tasked to render object 810. Also, during geometry pretesting object 810 may be determined to overlap region 820B. That is, portion 810B of object 810 overlaps region 820B. In that case, GPU-B is also tasked to render object 810.

FIG. 8B illustrates testing of portions of an object against screen regions and/or screen sub-regions when multiple GPUs collaborate to render a single image frame, in accordance with one embodiment of the present disclosure. That is, the pieces of geometry can be portions of objects. For example, object 810 may be split into pieces, such that the geometry used by or generated by a draw call is subdivided into smaller pieces of geometry. In one embodiment, the pieces of geometry are each roughly the size for which the position cache and/or parameter cache are allocated. In that case, the information (e.g. hint or hints) are generated for those smaller pieces of geometry during geometry testing, wherein the information is used by the rendering GPU, as previously described.

For example, object 810 is split into smaller objects, such that the pieces of geometry used for region testing corresponds to these smaller objects. As shown, object 810 is split into pieces of geometry "a", "b", "c", "d", "e", and "f". After geometry pretesting, GPU-A renders only pieces of geometry "a", "b", "c", "d", and "e". That is, GPU-A can skip rendering piece of geometry "f". Also, after geometry pretesting, GPU-B renders only pieces of geometry "d," "e," and "f." That is, GPU-B can skip rendering pieces of geometry "a", "b", and "c".

In one embodiment, as the geometry processing stage is configured to perform both vertex processing and primitive processing, it is possible to perform geometry pretesting on a piece of geometry using the shaders in the geometry processing stage. For example, the geometry processing stage generates the information (e.g. hint), such as by testing a bounding frustum for the geometry against GPU screen regions, that may be performed by software shader operations. In one embodiment, this test is accelerated through the use of a dedicated instruction or instructions implemented through hardware, thereby implementing a software/hardware solution. That is, the dedicated instruction or instructions is used to accelerate the generation of the information regarding the piece of geometry and its relation to screen regions. For example, the homogeneous coordinates of the vertices of the primitive of a piece of geometry are provided as inputs to the instruction for geometry pretesting in the geometry processing stage. The testing may generate a Boolean return value for each GPU that indicates whether or not the primitive overlaps any screen region (e.g. in a corresponding set) assigned to that GPU for object rendering. As such, the information (e.g. hint) generated during geometry pretesting regarding the corresponding piece of geometry and its relation to screen regions is generated by shaders in the geometry processing stage.

In another embodiment, the geometry pretesting on a piece of geometry can be performed in a hardware rasterization stage. For example, a hardware scan converter may be configured to perform geometry pretesting, such that the scan converter generates information regarding all the screen regions assigned to the plurality of GPUs for object rendering of the corresponding image frame.

In still another embodiment, the pieces of geometry can be primitives. That is, the portions of objects used for geometry pretesting may be primitives. As such, the information generated during geometry pretesting (e.g. hint) by one GPU indicates whether or not individual triangles (e.g. representing primitives) need to be rendered by another rendering GPU.

In one embodiment, the information generated during geometry pretesting and shared by the GPUs used for rendering includes a number of primitives (e.g. a surviving primitive count) that overlap any screen region (e.g. in a corresponding set) that is assigned to a corresponding GPU for object rendering. The information may also include the number of vertices used for building or defining those primitives. That is, the information includes a surviving vertex count. As such, when rendering the corresponding rendering GPU may use the supplied vertex count to allocate space in the position cache and parameter cache. For example, vertices that are not needed do not have any allocated space, which may increase the efficiency of rendering, in one embodiment.

In other embodiments, the information generated during geometry pretesting (e.g. hint) includes the specific primitives (e.g. surviving primitives as an exact match) that overlap any screen region (e.g. in a corresponding set) assigned to the corresponding GPU for object rendering. That is, the information generated for the rendering GPU includes a specific set of primitives for rendering. The information may also include the specific vertices used for building or defining those primitives. That is, the information generated for the rendering GPU includes a specific set of vertices for rendering. This information may, for example, save the other rendering GPU time during its geometry processing stage when rendering the piece of geometry.

In still other embodiments, there may be processing overhead (either software or hardware) associated with generating the information during geometry testing. In that case, it may be beneficial to skip generating information for certain pieces of geometry. That is, information provided as hints is generated for certain objects but not for others. For example, a piece of geometry (e.g., an object or portions of the object) that represents a skybox or a large piece of terrain may include triangles that are large. In that case, it is likely that each GPU used for multi-GPU rendering of an image frame or each of one or more image frames in a sequence of image frames will need to render those pieces of geometry. That is, the information may be generated or not generated depending on the properties of the corresponding piece of geometry.

FIGS. 9A-9C illustrates various strategies for assigning screen regions to corresponding GPUs when multiple GPUs collaborate to render a single image, in accordance with one embodiment of the present disclosure. To achieve GPU processing efficiency various techniques may be used when dividing the screen into regions, such as increasing or decreasing the number of regions (e.g., to choose the correct amount of regions), interleaving regions, increasing or decreasing the number of regions for interleaving, selecting a particular pattern when interleaving regions, etc. For instance, the multiple GPUs are configured to perform multi-GPU rendering of geometry for an image frame generated by an application by pretesting the geometry against interleaved screen regions before rendering objects in a corresponding image. The configurations of screen regions in FIGS. 9A-9C are designed to reduce any imbalance of rendering time between the plurality of GPUs. The complexity of the test (e.g. overlap a corresponding screen region) varies depending on how the screen regions are assigned to GPUs. As shown in the diagrams shown in FIGS. 9A-9C, the bold box 910 is the outline of a corresponding screen or display used when rendering the image.

In one embodiment, each of the plurality of screen regions or plurality of regions is uniformly sized. In one embodiment, each of the plurality of screen regions is not uniform in size. In still another embodiment, the number and sizing screen regions in a plurality of screen regions changes dynamically.

In particular, FIG. 9A illustrates a straightforward pattern 900A for screen 910. Each of the screen regions is uniformly sized. For example, the size of each of the regions may be a rectangle of a dimension that is a power of 2 pixels. For example, each region may be 256×256 pixels in size. As shown, the region assignment is a checkerboard pattern, with one row of A and B regions alternated with another row of B and C regions. The pattern 900A may be easily tested during geometry pretesting. However, there may be some rendering inefficiencies. For example, the screen area assigned to each GPU is substantially different (i.e., there is less coverage for screen region C and region D in screen 910), which may lead to an imbalance in the rendering time for each GPU.

FIG. 9B illustrates pattern 900B of screen regions for screen 910. Each of the screen or sub regions is uniformly sized. The screen regions are assigned and distributed so as to reduce the imbalance of rendering time between the GPUs. For example, assignment of GPUs to screen regions in pattern 900B results in nearly equal amounts of screen pixels assigned to each GPU across screen 910. That is, the screen regions are assigned to GPUs in such a way as to equalize screen area or coverage in screen 910. For example, if each region may be 256×256 pixels in size, each of the regions have approximately the same coverage in screen 910. In particular, the set of screen regions A covers an area 6×256×256 pixels in size, the set of screen regions B covers an area 5.75×256×256 pixels in size, the set of screen regions C covers an area 5.5×256×256 pixels in size, and the set of screen regions D covers an area 5.5×256×256 pixels in size.

FIG. 9C illustrates pattern 900C of screen regions for screen 910. Each of the screen regions is not uniform in size. That is, screen regions for which GPUs are assigned responsibility for rendering objects may not be uniform in size. In particular, screen 910 is divided such that each GPU is assigned to an identical number of pixels. For example, if a 4K display (3840×2160) were to be divided equally into four regions vertically, then each region would be 520 pixels tall. However, typically GPUs perform many operations in 32×32 blocks of pixels, and 520 pixels is not a multiple of 32 pixels. As such, pattern 900C may include blocks that are at a height of 512 pixels (a multiple of 32), and other blocks that are at a height of 544 pixels (also a multiple of 32), in one embodiment. Other embodiments may use differently sized blocks. Pattern 900C shows equal amounts of screen pixels assigned to each GPU, by using non-uniform screen regions.

In still another embodiment, the needs of the application when performing rendering of images change over time, and the screen regions are chosen dynamically. For example, if it is known that most of the rendering time is spent on the lower half of the screen, then it would be advantageous to assign regions in such a way that nearly equal amounts of screen pixels in the lower half of the display are assigned to each GPU used for rendering the corresponding image. That is, the regions assigned to each of the GPUs used for rendering the corresponding image may be changed dynamically. For instance, the changes may be applied based on game modes, different games, size of screen, pattern chosen for the regions, etc.

Figure 10:
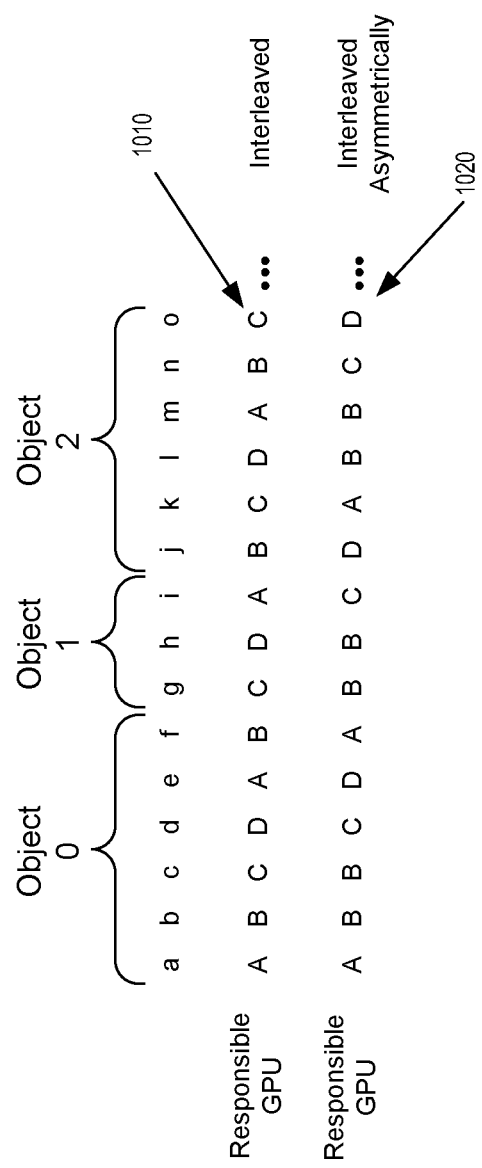
FIG. 10 is a diagram illustrating various distributions of GPU assignment for performing geometry pretesting on a plurality of pieces of geometry, in accordance with embodiments of the present disclosure.

FIG. 10 is a diagram illustrating various distributions of the assignment of GPUs to pieces of geometry for purposes of performing geometry pretesting, in accordance with one embodiment of the present disclosure. That is, FIG. 10 shows the distribution of responsibility for the generation of information during geometry pretesting between multiple GPUs. As previously described, each GPU is assigned to a corresponding portion of the geometry of an image frame, wherein that portion may be further partitioned into objects, portions of objects, geometry, pieces of geometry, etc. Geometry pretesting includes determining whether or not a particular piece of geometry overlaps any screen region or screen regions that is assigned to a corresponding GPU for object rendering. Geometry pretesting is typically performed in embodiments simultaneously for all geometry (e.g. all pieces of geometry) of a corresponding image frame by the GPUs. In that manner, geometry testing is performed collaboratively by the GPUs allows each GPU to know which pieces of geometry to render, and which pieces of geometry to skip rendering, as previously described.

As shown in FIG. 10, each piece of geometry may be an object, portion of an object, etc. For example, the pieces of geometry may be portions of objects, such as pieces roughly the size at which the position and/or parameter caches are allocated, as previously described. Purely for illustration, object 0 (e.g. as specified to be rendered by commands 722 in the rendering command buffer 700A) is split into pieces "a", "b", "c", "d", "e" and "f", such as object 810 in FIG. 8B.

Also, object 1 (e.g. as specified to be rendered by commands 724 in the rendering command buffer 700A) is split into pieces "g", "h", and "i". Further, object 2 (e.g. as specified to be rendered by commands 724 in the rendering command buffer 700A) is split into pieces "j", "k", "l", "m", "n", and "o". The pieces may be ordered (e.g., a-o) for purposes of distributing responsibility for geometry testing to the GPUs.

Distribution 1010 (e.g. the ABCDABCDABCD . . . row) shows an even distribution of the responsibility for performing geometry testing between a plurality of GPUs. In particular, rather than having one GPU take the first quarter of the geometry (e.g. in a block, such as GPU A takes the first four pieces of the approximately sixteen total pieces including "a", "b", "c" and "d" for geometry testing), and the second GPU take the second quarter, etc., assignment to GPUs is interleaved. That is, successive pieces of geometry are assigned to different GPUs. For example, piece "a" is assigned to GPU-A, piece "b" is assigned to GPU-B, piece "c" is assigned to GPU-C, piece "d" is assigned to GPU-D, piece "e" is assigned to GPU-A, piece "f" is assigned to GPU-B, piece "g" is assigned to GPU-C, etc. As a result, processing of geometry testing is roughly balanced between the GPUs (e.g., GPU-A, GPU-B, GPU-C, and GPU-D).

Distribution 1020 (e.g., the ABBCDABBCDABBCD . . . row) shows an asymmetric distribution of the responsibility for performing geometry testing between a plurality of GPUs. The asymmetric distribution may be advantageous when certain GPUs have more time to perform geometry testing than other GPUs when rendering a corresponding image frame. For example, one GPU may have finished rendering objects for the previous frame or frames of a scene earlier than the other GPUs, and therefore (since it is anticipated it will finish earlier this frame as well) it can be assigned more pieces of geometry for performing geometry testing. Again, the assignment to GPUs is interleaved. As shown, GPU-B is assigned more pieces of geometry for geometry pretesting than other GPUs. For illustration, piece "a" is assigned to GPU-A, piece "b" is assigned to GPU-B, piece "c" is also assigned to GPU-B, piece "d" is assigned to GPU-C, piece "e" is assigned to GPU-D, piece "f" is assigned to GPU-A, piece "g" is assigned to GPU-B, piece "h" is also assigned to GPU-B, piece "i" is assigned to GPU-C, etc. Though the assignment of geometry testing to GPUs may not be balanced, the combined processing of the complete phase (e.g. geometry pretesting and rendering of geometry) may turn out to be roughly balanced (e.g. each GPU spends approximately the same amount of time to perform geometry pretesting and rendering of geometry).

Figure 11A:
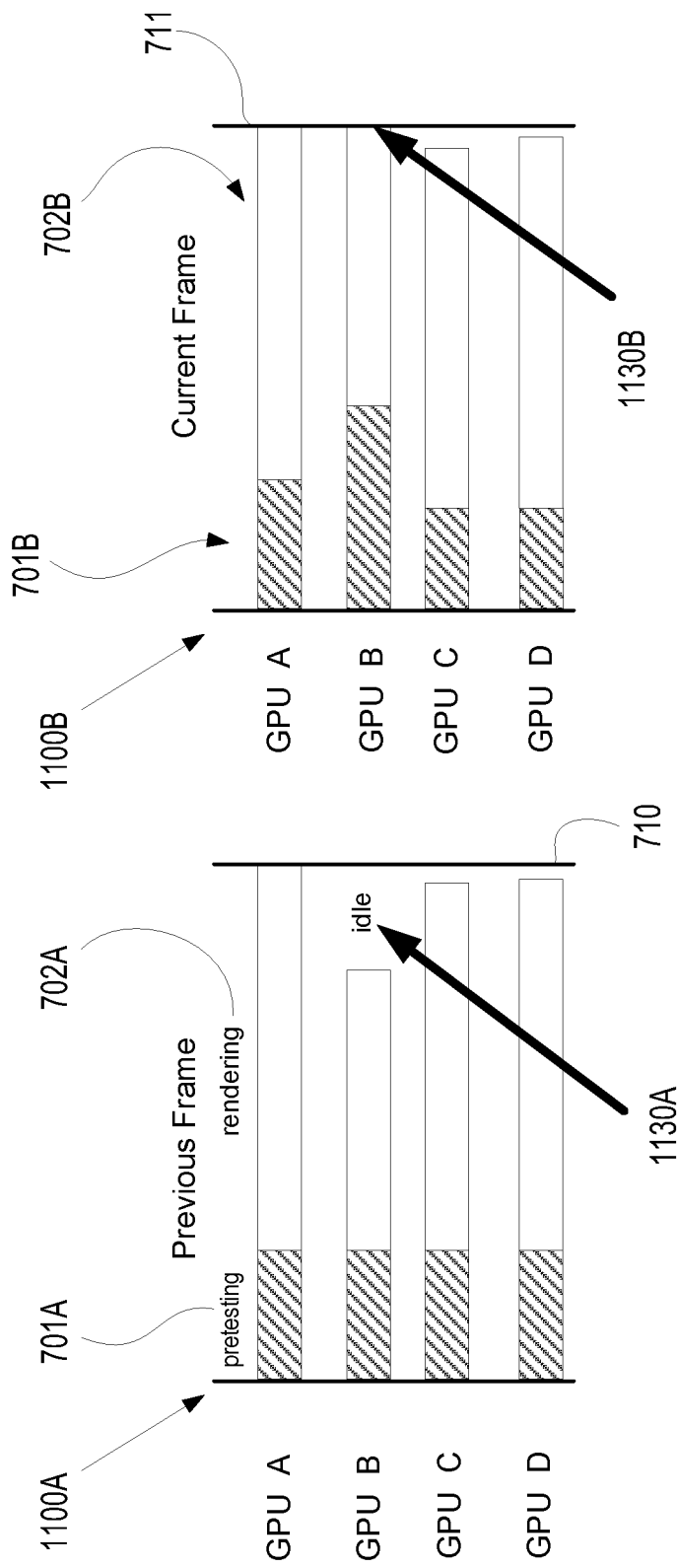
FIG. 11A is a diagram illustrating the pretesting and rendering of geometry of a previous image frame by a plurality of GPUs, and the use of statistics collected during rendering to influence the assignment of pretesting of geometry of a current image frame to the plurality of GPUs in the current image frame, in accordance with one embodiment of the present disclosure.
Figure 11B:
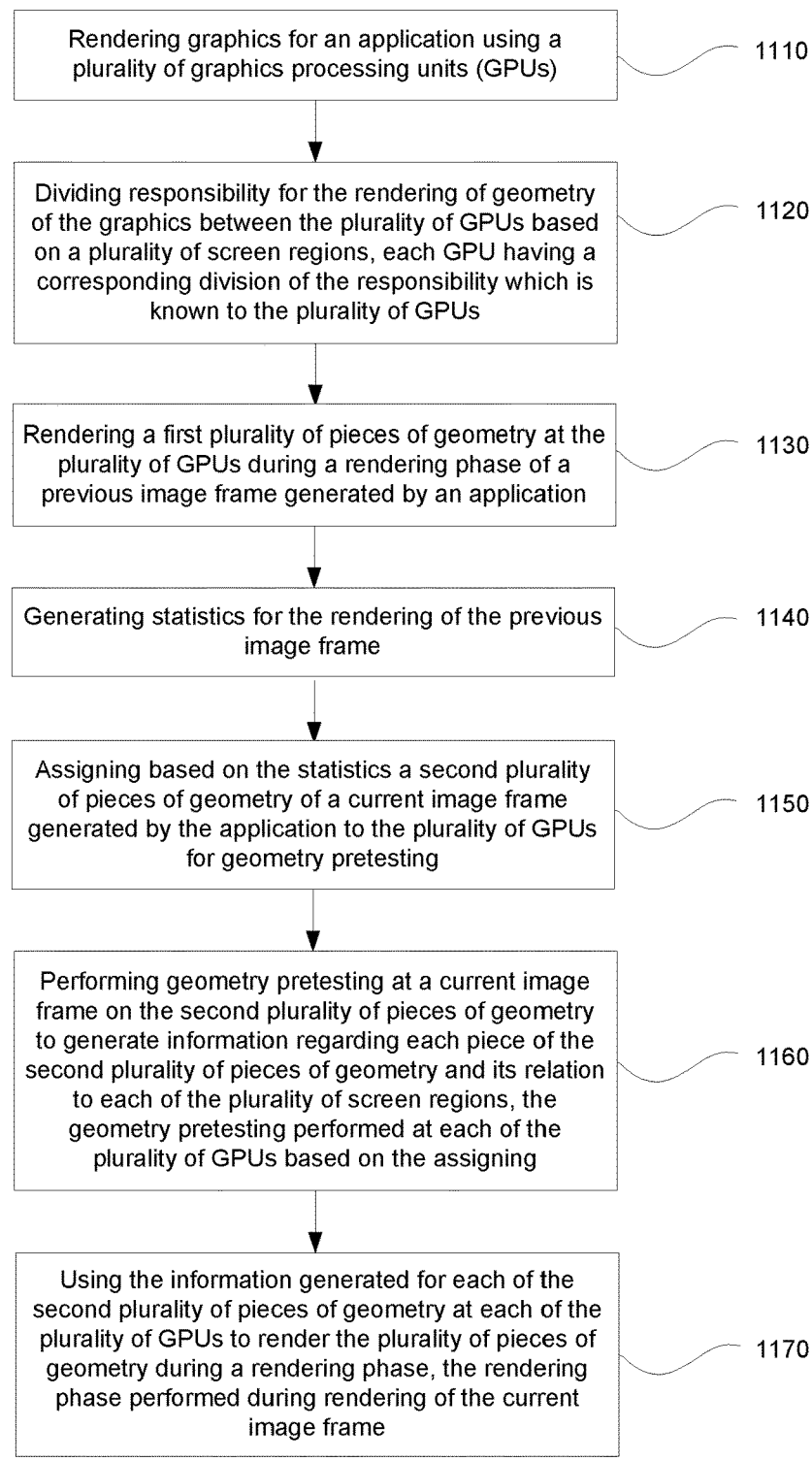
FIG. 11B is a flow diagram illustrating a method for graphics processing including pretesting and rendering of geometry of a previous image frame by a plurality of GPUs, and the use of statistics collected during rendering to influence the assignment of pretesting of geometry of a current image frame to the plurality of GPUs in the current image frame, in accordance with one embodiment of the present disclosure.

FIGS. 11A-11B illustrate the use of statistics for one or more image frames when assigning responsibility for performing geometry testing between a plurality of GPUs. For example, based on statistics some GPUs may process more or fewer pieces of geometry during geometry testing to generate information useful when rendering.

In particular, FIG. 11A is a diagram illustrating the pretesting and rendering of geometry of a previous image frame by a plurality of GPUs, and the use of statistics collected during rendering to influence the assignment of pretesting of geometry of a current image frame to the plurality of GPUs in the current image frame, in accordance with one embodiment of the present disclosure. Purely for illustration, in the second frame 1100B of FIG. 11A, GPU-B processes twice as many pieces of geometry (e.g. during pretesting) than the other GPUs (e.g. GPU-A, GPU-C, and GPU-D). The distribution and assignment of more pieces of geometry to GPU-B to perform geometry pretesting in a current image frame is based on statistics collected during rendering of the previous image frame, or previous image frames.

For example, timing diagram 1100A shows geometry pretesting 701A and rendering 702A for a previous image frame, wherein four GPUs (e.g. GPU-A, GPU-B, GPU-C, and GPU-D) are used for both processes. The assignment of the geometry (e.g. pieces of geometry) of the previous image frame is evenly distributed between the GPUs. This is shown by the roughly balanced performances of geometry pretesting 701A by each of the GPUs.

Rendering statistics collected from one or more image frames may be used in determining how to perform geometry testing and rendering of a current image frame. That is, the statistics may be provided as information for use when performing geometry testing and rendering of a subsequent image frame (e.g. the current image frame). For example, statistics collected during rendering of the objects (e.g. pieces of geometry) of the previous image frame may indicate that GPU-B has finished rendering earlier than the other GPUs. In particular, GPU-B has idle time 1130A after rendering its portion of the geometry that overlaps any screen region (e.g. in a corresponding set) assigned to GPU-B for object rendering. Each of the other GPU-A, GPU-C, and GPU-D perform rendering approximately up to the end 710 of the corresponding frame period of the previous image frame.

The previous image frame and the current image frame may be generated for a particular scene when executing an application. As such, the objects from scene to scene may be approximately similar in number and location. In that case, the time for performing geometry pretesting and rendering would be similar for GPUs between multiple image frames in a sequence of image frames. That is, it is reasonable to presume that GPU-B will also have idle time when performing geometry testing and rendering in the current image frame, based on the statistics. As such, GPU-B may be assigned more pieces of geometry for geometry pretesting in the current frame. For example, by having GPU-B process more pieces of geometry during geometry pretesting, the result is that GPU-B finishes at approximately the same time as the other GPUs after rendering objects in the current image frame. That is, each of the GPU-A, GPU-B, GPU-C, and GPU-D perform rendering approximately up to the end 711 of the corresponding frame period of the current image frame. In one embodiment, the total time to render the current image frame is reduced, such that it takes less time to render the current image frame when using rendering statistics. As such, statistics for the rendering of the previous frame and/or previous frames may be used to tune the geometry pretesting, such as the distribution of the assignment of the geometry (e.g. pieces of geometry) between the GPUs in the current image frame.

FIG. 11B is a flow diagram 1100B illustrating a method for graphics processing including pretesting and rendering of geometry of a previous image frame by a plurality of GPUs, and the use of statistics collected during rendering to influence the assignment of pretesting of geometry of a current image frame to the plurality of GPUs in the current image frame, in accordance with one embodiment of the present disclosure. The diagram of FIG. 11A illustrates the use of statistics in the method of flow diagram 1100B to determine the distribution of assignments of geometry (e.g. pieces of geometry) between the GPUs for an image frame. As previously described, various architectures may include multiple GPUs collaborating to render a single image by performing multi-GPU rendering of geometry for an application, such as within one or more cloud gaming servers of a cloud gaming system, or within a stand-alone system, such as a personal computer or gaming console that includes a high-end graphics card having multiple GPUs, etc.

In particular, at 1110 the method includes rendering graphics for an application using a plurality of GPUs, as previously described. At 1120, the method includes dividing responsibility for rendering geometry of the graphics between the plurality of GPUs based on a plurality of screen regions. Each GPU has a corresponding division of the responsibility which is known to the plurality of GPUs. More specifically, each of the GPUs is responsible for rendering geometry in a corresponding set of screen regions of the plurality of screen regions, wherein the corresponding set of screen regions includes one or more screen regions, as previously described. In one embodiment, the screen regions are interleaved (e.g. when a display is divided into sets of screen regions for geometry pretesting and rendering).

At 1130, the method includes rendering a first plurality of pieces of geometry at the plurality of GPUs of a previous image frame generated by an application. For example, timing diagram 1100A illustrates the timing of performing geometry testing of pieces of geometry and rendering of objects (e.g. pieces of geometry) in the previous image frame. At 1140, the method includes generating statistics for the rendering of the previous image frame. That is, statistics may be collected when rendering the previous image frame.

At 1150, the method includes assigning based on the statistics a second plurality of pieces of geometry of a current image frame generated by the application to the plurality of GPUs for geometry testing. That is, those statistics may be used to assign the same, fewer, or more pieces of geometry for geometry testing to a particular GPU when rendering the next, or current image frame. In some cases, the statistics may indicate that the pieces in the second plurality of pieces of geometry should be assigned evenly to the plurality of GPUs when performing geometry testing.

In other cases, the statistics may indicate that the pieces in the second plurality of pieces of geometry should be assigned unevenly to the plurality of GPUs when performing geometry testing. For example, as shown in timeline 1100A statistics may indicate that GPU-B finishes rendering before any of the other GPUs in the previous image frame. In particular, it may be determined that a first GPU (e.g. GPU-B) finished rendering the first plurality of pieces of geometry before a second GPU (e.g. GPU-A) finished rendering the first plurality of pieces of geometry (e.g., its portion of pieces of geometry). As previously described, the first GPU (e.g. GPU-B) renders one or more pieces of the first plurality of pieces of geometry that overlap any screen region assigned to the first GPU for object rendering, and the second GPU (e.g. GPU-A) renders one or more pieces of the first plurality of pieces of geometry that overlap any screen region assigned to the second GPU for object rendering. As such, because it is anticipated based on the statistics that the first GPU (e.g. GPU-B) will require less time for rendering the second plurality of pieces of geometry than the second GPU (e.g. GPU-A), more pieces of geometry may be assigned to the first GPU for geometry pretesting when rendering the current image frame. For example, a first number of the second plurality of pieces of geometry may be assigned to the first GPU (e.g. GPU-B) for geometry testing, and a second number of the second plurality of pieces of geometry may be assigned to the second GPU (e.g., GPU-A) for geometry testing, wherein the first number is higher than the second number (if the time imbalance is sufficiently large, then GPU-A may be assigned no pieces at all). In that manner, GPU-B processes more pieces of geometry than GPU-A during geometry testing. For example, timing diagram 1100B shows that GPU-B has been assigned more pieces of geometry, and spends more time performing geometry testing than the other GPUs.

At 1160, the method includes performing geometry pretesting at a current image frame on the second plurality of pieces of geometry to generate information regarding each piece of the second plurality of pieces of geometry and its relation to each of the plurality of screen regions. The geometry pretesting is performed at each of the plurality of GPUs based on the assigning. Geometry pretesting is performed at a pretest GPU on a plurality of pieces of geometry of an image frame generated by an application in order to generate information regarding each piece of geometry and its relation to each of the plurality of screen regions.

At 1170, the method includes using the information generated for each of the second plurality of pieces of geometry to render the plurality of pieces of geometry during a rendering phase (e.g. to include fully rendering a piece of geometry or skipping the rendering of that piece of geometry at a corresponding GPU). Rendering is typically performed in embodiments simultaneously at each of the GPUs. In particular, the plurality of pieces of geometry of the current image frame is rendered at each of the plurality of GPUs using the information generated for each of the pieces of geometry.

In other embodiments, the distribution of pieces of geometry to GPUs for generation of the information is dynamically adjusted. That is, an assignment of pieces of geometry for a current image frame for performing geometry pretesting may be dynamically adjusted during the rendering of the current image frame. For example, in the example of timing diagram 1100B, it may be determined that GPU-A was performing geometry pretesting of its assigned pieces of geometry at a rate slower than expected. As such, the pieces of geometry assigned to GPU-A for geometry pretesting can be reassigned on-the-fly, such as reassigning a piece of geometry from GPU-A to GPU-B, such that GPU-B is now tasked to perform geometry pretesting on that piece of geometry, during the frame period used for rendering the current image frame.

Figure 12A:
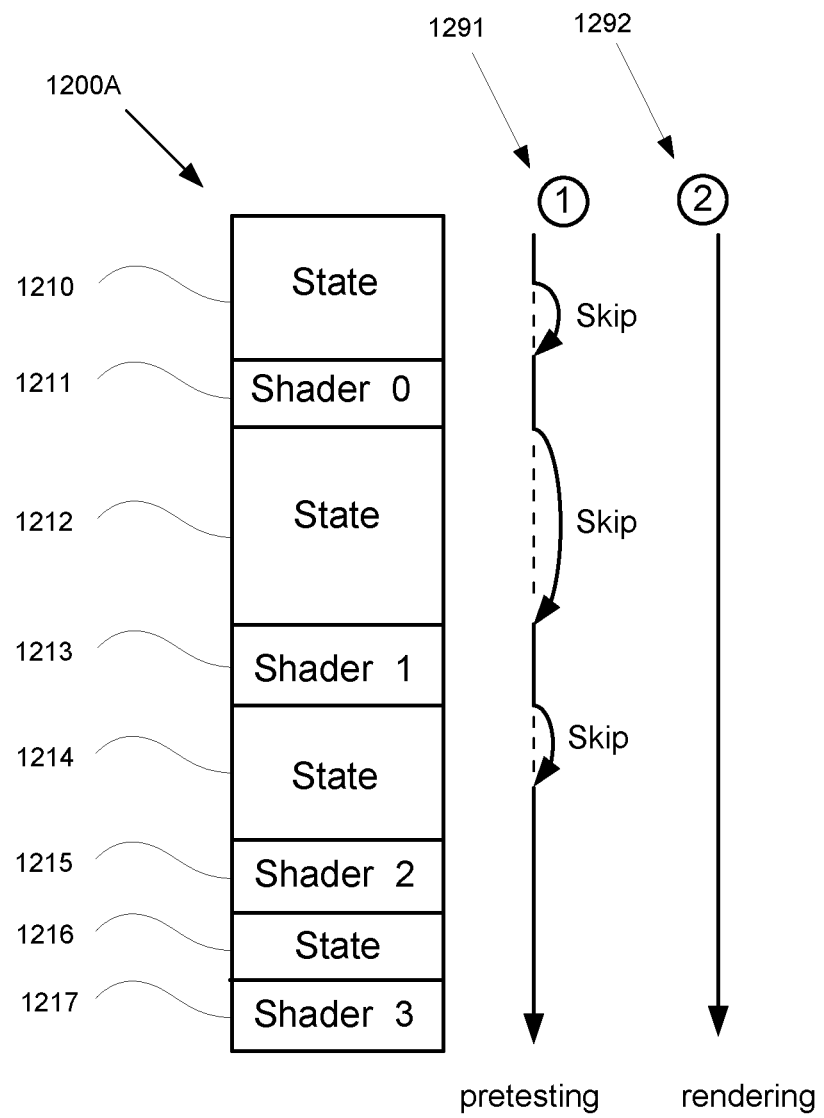
FIG. 12A is a diagram illustrating the use of shaders configured to perform both pretesting and rendering of geometry of an image frame in two passes through a portion of the command buffer, in accordance with one embodiment of the present disclosure.
Figure 12B:
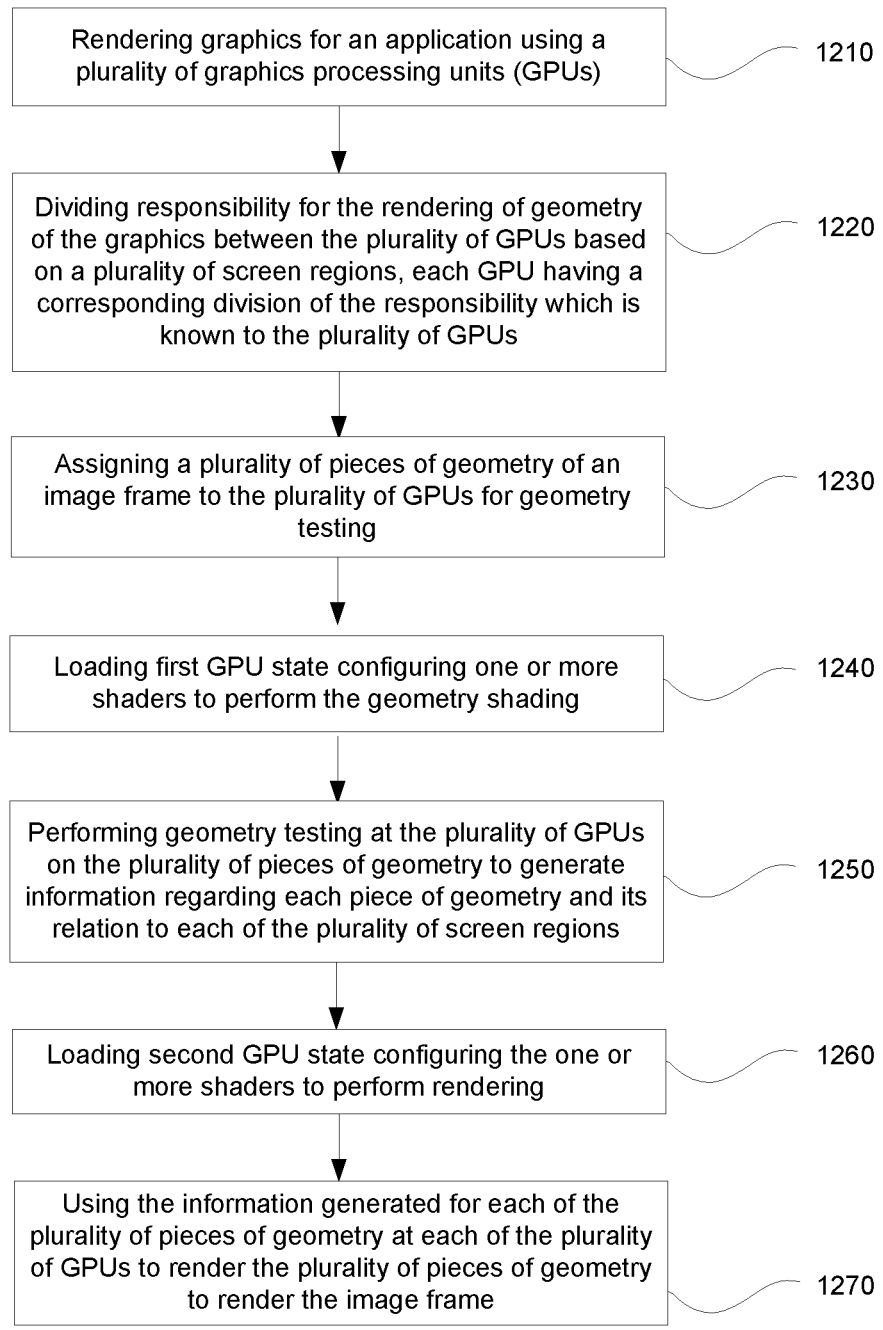
FIG. 12B is a flow diagram illustrating a method for graphics processing including performing both pretesting and rendering of geometry of an image frame using the same set of shaders in two passes through a portion of the command buffer, in accordance with one embodiment of the present disclosure.

FIGS. 12A-12B illustrate another strategy for processing rendering command buffers. Previously, one strategy was described in relation to FIG. 7A-7C, wherein a command buffer contains commands for geometry pretesting on objects (e.g. pieces of geometry), followed by commands for rendering of the objects (e.g., pieces of geometry). FIGS. 12A-12B show a geometry pretesting and rendering strategy that uses shaders that are capable of performing either operation depending on GPU configuration.

In particular, FIG. 12A is a diagram illustrating the use of shaders configured to perform both pretesting and rendering of geometry of an image frame in two passes through a portion of the command buffer 1200A, in accordance with one embodiment of the present disclosure. That is, the shaders used for performing commands in the command buffer 1200A may be configured to perform either geometry pretesting when properly configured, or to perform rendering when properly configured.

As shown, the portion of the command buffer 1200A shown in FIG. 12A is executed twice, with different actions resulting from each execution; the first execution results in performing geometry pretesting, and the second execution results in performing rendering of the geometry. This can be accomplished in a variety of ways, e.g. the portion of the command buffer depicted in 1200A can be explicitly called twice as a subroutine, with different state (e.g. a register setting or value in RAM) explicitly set to different values prior to each call. Alternatively, the portion of the command buffer depicted in 1200A can be implicitly executed twice, e.g. by using special commands to mark beginning and end of the portion to execute twice, and to implicitly set a different configuration (e.g. a register setting) for the first and second executions of the portion of the command buffer. When the commands in the portion of the command buffer 1200A are executed (e.g., commands that set state or commands that execute a shader), based on GPU state, the results of the commands are different (e.g. result in performing geometry pretesting vs. performing rendering). That is, the commands in the command buffer 1200A may be configured for geometry pretesting or rendering. In particular, the portion of command buffer 1200A includes commands for configuring a state of the one or more GPUs executing commands from the rendering command buffer 1200A, and commands for executing a shader that performs either geometry pretesting or rendering depending on the state. For example, commands 1210, 1212, 1214, and 1216 are each used for configuring a state of the one or more GPUs for purposes of executing a shader that performs either geometry pretesting or rendering depending on the state. As shown, command 1210 configures GPU state so that shader 0 may be executed via commands 1211 and perform either geometry pretesting or rendering. Also, command 1212 configures GPU state so that shader 1 may be executed via commands 1213 to perform geometry pretesting or rendering. In addition, command 1214 configures GPU state so that shader 2 may be executed via commands 1215 to perform either geometry pretesting or rendering. Finally, command 1216 configures GPU state so that shader 3 may be may be executed via commands 1217 to perform either geometry pretesting or rendering.

On the first traversal 1291 through the command buffer 1200A, based on GPU state set explicitly or implicitly as described above, as well as GPU state configured by commands 1210, 1212, 1214, and 1216, the corresponding shaders perform geometry pretesting. For example, shader 0 is configured to perform geometry pretesting on object 0 (e.g. a piece of geometry) (e.g. based on the objects shown in FIG. 7B-1), shader 1 is configured to perform geometry pretesting on object 1, shader 2 is configured to perform geometry pretesting on object 2, and shader 3 is configured to perform geometry pretesting on object 3.

In one embodiment, based on the GPU state, commands may be skipped or interpreted differently. For example, certain commands that set state (portions of 1210, 1212, 1214 and 1216) may be skipped based on GPU state that is set explicitly or implicitly as described above; e.g. if configuring the shader 0 executed via command 1210 requires less GPU state to be configured for geometry pretesting than when it is configured for rendering of geometry, then it may be beneficial to skip setting the unnecessary portions of the GPU state as setting of GPU state may carry an overhead. To give another example, certain commands that set state (portions of 1210, 1212, 1214 and 1216) may be interpreted differently based on GPU state that is set explicitly or implicitly as described above; e.g. if shader 0 executed via command 1210 requires different GPU state to be configured for geometry pretesting than when it is configured for rendering of geometry, or if shader 0 executed via command 1210 requires an input that is different for geometry pretesting and for rendering of geometry.

In one embodiment, the shaders configured for geometry pretesting do not allocate space in the position and parameter caches, as previously described. In another embodiment, a single shader is used to perform either the pretesting or the rendering. This could be done in a variety of ways, such as via external hardware state that the shader could check (e.g. as set explicitly or implicitly as described above), or via an input to the shader (e.g. as set by a command that is interpreted differently in the first and second passes through the command buffer).

On the second traversal 1292 through the command buffer 1200A, based on GPU state set explicitly or implicitly as described above, as well as GPU state as configured by commands 1210, 1212, 1214, and 1216, the corresponding shaders perform rendering of pieces of geometry for a corresponding image frame. For example, shader 0 is configured to perform rendering of object 0 (e.g. a piece of geometry) (e.g. based on the objects shown in FIG. 7B-1). Also, shader 1 is configured to perform rendering of object 1, shader 2 is configured to perform rendering of object 2, and shader 3 is configured to perform rendering of object 3.

FIG. 12B is a flow diagram 1200B illustrating a method for graphics processing including performing both pretesting and rendering of geometry of an image frame using the same set of shaders in two passes through a portion of the command buffer, in accordance with one embodiment of the present disclosure. As previously described, various architectures may include multiple GPUs collaborating to render a single image by performing multi-GPU rendering of geometry for an application, such as within one or more cloud gaming servers of a cloud gaming system, or within a stand-alone system, such as a personal computer or gaming console that includes a high-end graphics card having multiple GPUs, etc.

In particular, at 1210 the method includes rendering graphics for an application using a plurality of GPUs, as previously described. At 1220, the method includes dividing responsibility for rendering geometry of the graphics between the plurality of GPUs based on a plurality of screen regions. Each GPU has a corresponding division of the responsibility which is known to the plurality of GPUs. More specifically, each of the GPUs is responsible for rendering geometry in a corresponding set of screen regions of the plurality of screen regions, wherein the corresponding set of screen regions includes one or more screen regions, as previously described. In one embodiment, the screen regions are interleaved (e.g. when a display is divided into sets of screen regions for geometry pretesting and rendering).

At 1230, the method includes assigning a plurality of pieces of geometry of an image frame to the plurality of GPUs for geometry testing. In particular, each of the plurality of GPUs is assigned to a corresponding portion of the geometry associated with an image frame for purpose of geometry testing. As previously described, the assignments of pieces of geometry may be evenly or unevenly distributed, wherein each portion includes one or more pieces of geometry, or potentially no pieces of geometry at all, in embodiments.

At 1240, the method includes loading first GPU state configuring one or more shaders to perform the geometry pretesting. For example, depending on GPU state, a corresponding shader may be configured to perform different operations. As such, the first GPU state configures corresponding shaders to perform geometry pretesting. In the example of FIG. 12A, this can be set in a variety of ways, e.g. by explicitly or implicitly setting state externally to the portion of the command buffer depicted in 1200A, as described above. In particular, the GPU state may be set in a variety of ways. For example, the CPU or GPU could set a value in random access memory (RAM), wherein the GPU would check the value in RAM. In another example, the state could be internal to the GPU, such as when a command buffer is called as a subroutine twice with internal GPU state being different between the two subroutine calls. Alternatively, the commands 1210 in FIG. 12A can be interpreted differently or skipped based on the state set explicitly or implicitly as described above. Based on this first GPU state, shader 0 executed by command 1211 is configured to perform geometry pretesting.

At 1250, the method includes performing geometry pretesting at the plurality of GPUs on the plurality of pieces of geometry to generate information regarding each piece of geometry and its relation to each of the plurality of screen regions. As previously described, geometry pretesting may determine whether a piece of geometry overlaps any screen regions (e.g. in a corresponding set) that are assigned to a corresponding GPU for object rendering. Because geometry pretesting is typically performed in embodiments simultaneously for all geometry of a corresponding image frame by the GPUs, each GPU is able to know which pieces of geometry to render, and which pieces of geometry to skip. This ends the first traversal through the command buffer, wherein shaders may be configured to perform each of geometry pretesting and/or rendering, depending on GPU state.

At 1260, the method includes loading second GPU state configuring the one or more shaders to perform rendering. As previously described, depending on GPU state, a corresponding shader may be configured to perform different operations. As such, the second GPU state configures corresponding shaders (the same shaders previously used to perform geometry pretesting) to perform rendering. In the example of FIG. 12A, based on this second GPU state, shader 0 executed by command 1211 is configured to perform rendering.

At 1270, the method includes at each of the plurality of GPUs using the information generated for each of the plurality of pieces of geometry when rendering the plurality of pieces of geometry (e.g. to include fully rendering a piece of geometry or skipping the rendering of that piece of geometry at a corresponding GPU). As previously described, the information may indicate whether a piece of geometry overlaps any screen region (e.g. in a corresponding set) that are assigned to a corresponding GPU for object rendering. That information may be used for rendering each of the plurality of pieces of geometry at each of the plurality of GPUs, such that each GPU can efficiently render only pieces of geometry that overlap at least one screen (e.g. in a corresponding set) assigned to that corresponding GPU for object rendering. This ends the second traversal through the command buffer, wherein shaders may be configured to perform each of geometry pretesting and/or rendering, depending on GPU state.

Figure 13A:
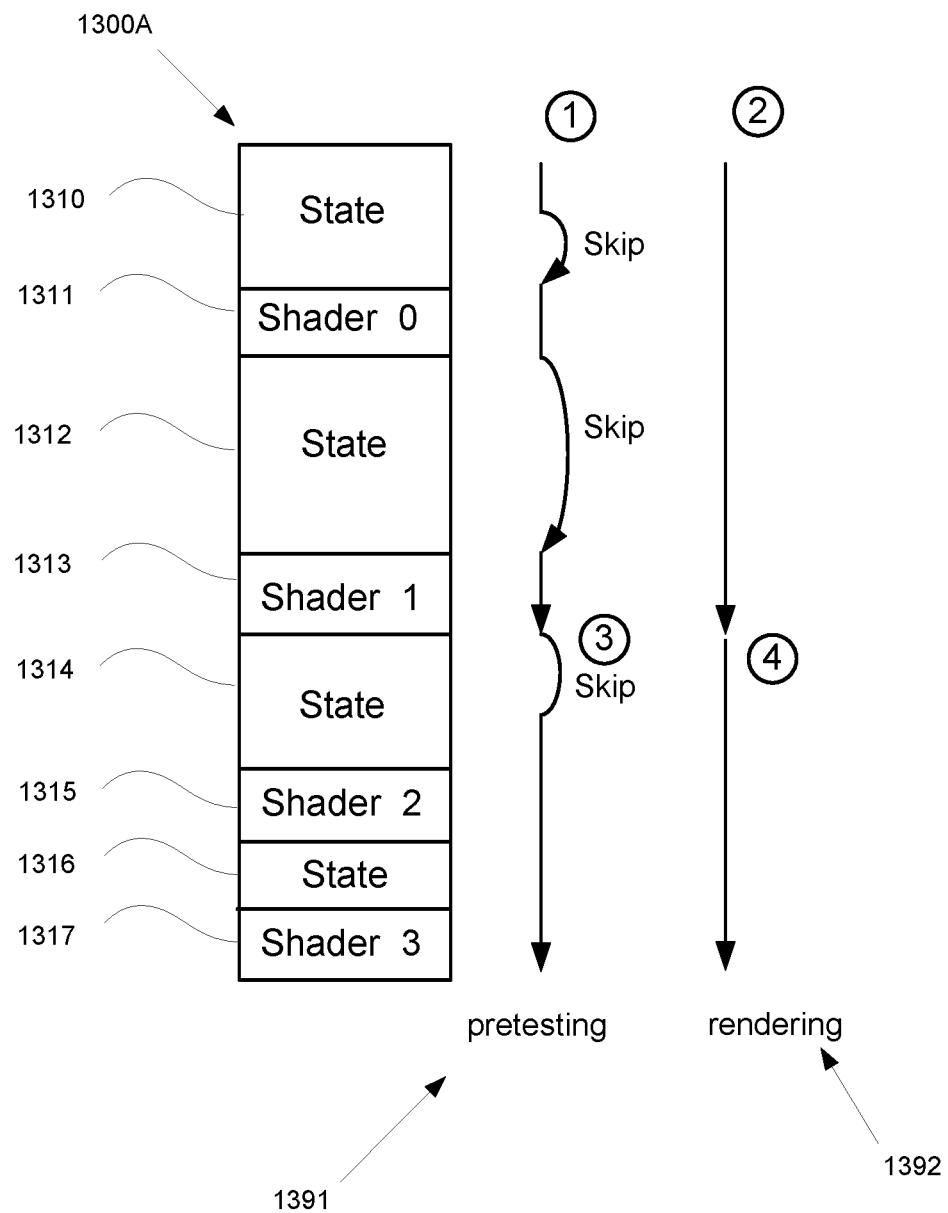
FIG. 13A is a diagram illustrating the use of shaders configured to perform both geometry testing and rendering, wherein geometry test and render performed for different sets of pieces of geometry are interleaved using separate portions of a corresponding command buffer, in accordance with one embodiment of the present disclosure.
Figure 13B:
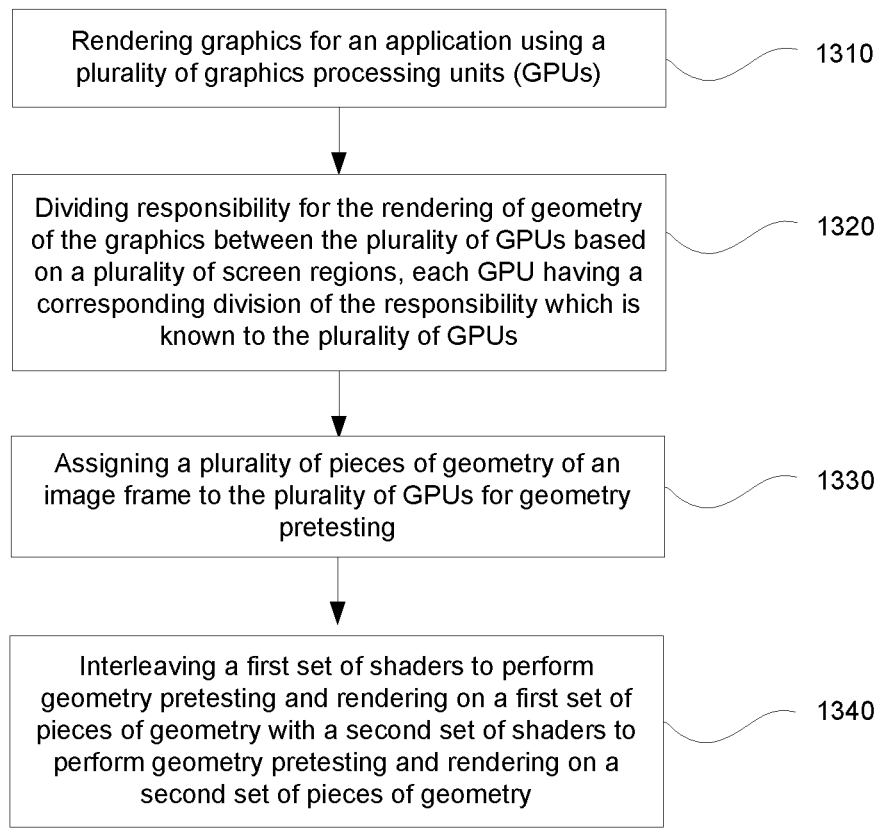
FIG. 13B is a flow diagram illustrating a method for graphics processing including interleaving pretesting and rendering of geometry of an image frame for different sets of pieces geometry using separate portions of a corresponding command buffer, in accordance with one embodiment of the present disclosure.

FIGS. 13A-13B illustrate another strategy for processing rendering command buffers. Previously, one strategy was described in relation to FIG. 7A-7C, wherein a command buffer contains commands for geometry pretesting of objects (e.g. pieces of geometry), followed by commands for rendering of the objects (e.g., pieces of geometry), and another strategy was described in FIGS. 12A-12B that uses shaders that are capable of performing either operation depending on GPU configuration. FIGS. 13A-13B show a geometry testing and rendering strategy that uses shaders capable of performing either geometry pretesting or rendering, and wherein the processes of geometry pretesting and rendering are interleaved for different sets of pieces of geometry, in accordance with embodiments of the present disclosure.

In particular, FIG. 13A is a diagram illustrating the use of shaders configured to perform both geometry pretesting and rendering, wherein geometry pretesting and rendering performed for different sets of pieces of geometry are interleaved using separate portions of a corresponding command buffer 1300A, in accordance with one embodiment of the present disclosure. That is, rather than executing the portion of the command buffer 1300A start to finish, the command buffer 1300A is dynamically configured and executed, so that geometry pretesting and rendering are interleaved for different sets of pieces of geometry. For example, in a command buffer, some shaders (e.g. executed via commands 1311 and 1313) are configured for performing geometry pretesting on a first set of pieces of geometry, wherein after geometry testing is performed those same shaders (e.g. executed by commands 1311 and 1313) are then configured for performing rendering. After rendering is performed on the first set of pieces of geometry, other shaders (e.g. executed via commands 1315 and 1317) in the command buffer are configured for performing geometry pretesting on a second set of pieces of geometry, wherein after geometry pretesting is performed those same shaders (e.g. executed via commands 1315 and 1317) are then configured for performing rendering, and rendering is performed using those commands on the second set of pieces of geometry. The benefit of this strategy is that imbalance between GPUs can be addressed dynamically, such as by using asymmetric interleaving of geometry testing throughout the rendering. An example of asymmetric interleaving of geometry testing was previously introduced in distribution 102 of FIG. 10.

As interleaving of geometry pretesting and rendering occurs dynamically, the configuration (e.g. via a register setting or a value in RAM) of the GPU occurs implicitly, which is to say that an aspect of the GPU configuration happens externally to the command buffer. For example, a GPU register may be set to 0 (indicating that geometry pretesting should occur) or 1 (indicating that rendering should occur); the interleaved traversal of the command buffer and the setting of this register may be controlled by the GPU based on numbers of objects processed, primitives processed, imbalance between the GPUs, etc. Alternatively, a value in RAM could be used. As a result of this external configuration (meaning set externally to the command buffer), when the commands in the portion of the command buffer 1300A are executed (e.g., commands that set state or commands that execute a shader), based on GPU state, the results of the commands are different (e.g. result in performing geometry pretesting vs. performing rendering). That is, the commands in the command buffer 1300A may be configured for geometry pretesting 1391 or rendering 1392. In particular, the portion of the command buffer 1300A includes commands for configuring a state of the one or more GPUs executing commands from rendering command buffer 1300A, and commands for executing a shader that performs either geometry pretesting or rendering depending on the state. For example, commands 1310, 1312, 1314, and 1316 are each used for configuring a state of GPUs for purposes of executing a shader that performs either geometry pretesting or rendering depending on the state. As shown, command buffer 1310 configures GPU state so that shader 0 may be executed via commands 1311 either for performing geometry pretesting or rendering of object 0. Also, command buffer 1312 configures GPU state so that shader 1 may be executed via commands 1313 either for performing geometry pretesting or rendering of object 1. Also, command buffer 1314 configures GPU state so that shader 2 may be executed via commands 1315 either for performing geometry pretesting or rendering of object 2. Further, command buffer 1316 configures GPU state so that shader 3 may be executed via commands 1317 either for performing geometry pretesting or rendering of object 3.

Geometry pretesting and rendering may be interleaved for different sets of pieces of geometry. For illustration purposes only, command buffer 1300A may be configured to perform geometry pretesting and rendering of objects 0 and 1 first, and then command buffer 1300A is configured to perform geometry pretesting and rendering of objects 2 and 3 second. It is understood that different numbers of pieces of geometry may be interleaved in different sections. For example, section 1 shows a first traversal through command buffer 1300A. Based on GPU state set implicitly as described above, as well as GPU state as configured by commands 1310 and 1312, the corresponding shaders perform geometry pretesting. For example, shader 0 is configured to perform geometry pretesting on object 0 (e.g. a piece of geometry) (e.g. based on objects shown in FIGS. 7B-1), and shader 1 is configured to perform geometry pretesting on object 1. Section 2 shows a second traversal through command buffer 1300A. Based on GPU state set implicitly as described above, as well as GPU state as configured by commands 1310 and 1312, the corresponding shaders perform rendering. For example, shader 0 is configured to now perform rendering of object 0, and shader 1 is configured to now perform rendering of object 1.

Interleaving of the performance of geometry pretesting and rendering on different sets of pieces of geometry is shown in FIG. 13A. In particular, section 3 shows a third partial traversal through command buffer 1300A. Based on GPU state set implicitly as described above, as well as GPU state as configured by commands 1314 and 1316, the corresponding shaders perform geometry pretesting. For example, shader 2 (executed via commands 1315) performs geometry testing on object 2 (e.g. a piece of geometry) (e.g. based on objects shown in FIGS. 7B-1), and shader 3 (executed via commands 1317) performs geometry testing on object 3. Section 4 shows a fourth partial traversal through command buffer 1300A. Based on GPU state set implicitly as described above, as well as GPU state as configured by commands 1314 and 1316, the corresponding shaders perform rendering. For example, shader 2 (executed via commands 1315) performs rendering of object 2, and shader 3 (executed via commands 1317) performs rendering of object 3.

Note that hardware contexts are preserved, or saved and restored. For example, the geometry pretesting GPU context at the end of section 1 is needed at the beginning of section 3 for performing geometry pretesting. Also, the rendering GPU context at the end of section 2 is needed for the beginning of section 4 for performing rendering.

In one embodiment, based on the GPU state, commands may be skipped or interpreted differently. For example, certain commands that set state (portions of 1310, 1312, 1314 and 1316) may be skipped based on GPU state that is set implicitly as described above; e.g. if configuring the shader 0 executed via command 1310 requires less GPU state to be configured for geometry testing than when it is configured for rendering of geometry, then it may be beneficial to skip setting the unnecessary portions of the GPU state as setting of GPU state may carry an overhead. To give another example, certain commands that set state (portions of 1310, 1312, 1314 and 1316) may be interpreted differently based on GPU state that is set implicitly as described above; e.g. if shader 0 executed via command 1310 requires different GPU state to be configured for geometry testing than when it is configured for rendering of geometry, or if shader 0 executed via command 1310 requires an input that is different for geometry testing and for rendering of geometry.

In one embodiment, the shaders configured for geometry pretesting do not allocate space in the position and parameter caches, as previously described. In another embodiment, a single shader is used to perform either the pretesting or the rendering. This could be done in a variety of ways, such as via external hardware state that the shader could check (e.g. as set implicitly as described above), or via an input to the shader (e.g. as set by a command that is interpreted differently in the first and second passes through the command buffer).

FIG. 13B is a flow diagram illustrating a method for graphics processing including interleaving pretesting and rendering of geometry of an image frame for different sets of pieces geometry using separate portions of a corresponding command buffer, in accordance with one embodiment of the present disclosure. As previously described, various architectures may include multiple GPUs collaborating to render a single image by performing multi-GPU rendering of geometry for an application, such as within one or more cloud gaming servers of a cloud gaming system, or within a stand-alone system, such as a personal computer or gaming console that includes a high-end graphics card having multiple GPUs, etc.

In particular, at 1310 the method includes rendering graphics for an application using a plurality of GPUs, as previously described. At 1320, the method includes dividing responsibility for rendering geometry of the graphics between the plurality of GPUs based on a plurality of screen regions. Each GPU has a corresponding division of the responsibility which is known to the plurality of GPUs. More specifically, each of the GPUs is responsible for rendering geometry in a corresponding set of screen regions of the plurality of screen regions, wherein the corresponding set of screen regions includes one or more screen regions, as previously described. In one embodiment, the screen regions are interleaved (e.g. when a display is divided into sets of screen regions for geometry pretesting and rendering).

At 1330, the method includes assigning a plurality of pieces of geometry of an image frame to the plurality of GPUs for geometry testing. In particular, each of the plurality of GPUs is assigned to a corresponding portion of the geometry associated with an image frame for purpose of geometry testing. As previously described, the assignments of pieces of geometry may be evenly or unevenly distributed, wherein each portion includes one or more pieces of geometry, or potentially no pieces of geometry at all.

At 1340, the method includes interleaving a first set of shaders in a command buffer with a second set of shaders, wherein the shaders are configured to perform both geometry pretesting and rendering. In particular, the first set of shaders is configured to perform geometry pretesting and rendering on a first set of pieces of geometry. Thereafter, the second set of shaders is configured to perform geometry pretesting and rendering on a second set of pieces of geometry. As previously described, geometry pretesting generates corresponding information regarding each piece of geometry in the first set or second set and its relation to each of the plurality of screen regions. The corresponding information is used by the plurality of GPUs to render each piece of geometry in first set or second set. As previously described, the GPU state may be set in a variety of ways in order to perform either geometry pretesting or rendering. For example, the CPU or GPU could set a value in random access memory (RAM), wherein the GPU would check the value in RAM. In another example, the state could be internal to the GPU, such as when a command buffer is called as a subroutine twice with internal GPU state being different between the two subroutine calls.

The interleaving process is further described. In particular, the first set of shaders of a command buffer is configured to perform geometry pretesting on the first set of pieces of geometry, as previously described. Geometry pretesting is performed at the plurality of GPUs on the first set of pieces of geometry to generate first information regarding each piece of geometry in the first set and its relation to each of the plurality of screen regions. Then, the first set of shaders is configured to perform rendering of the first set of pieces of geometry, as previously described. Thereafter, the first information is used when rendering the plurality of pieces of geometry at each of the plurality of GPUs (e.g. to include fully rendering the first set of pieces of geometry or skipping the rendering of the first set of pieces of geometry at a corresponding GPU). As previously described, the information indicates which pieces of geometry overlap screen regions assigned to a corresponding GPU for object rendering. For example, the information may be used to skip rendering a piece of geometry at a GPU when that information indicates that the piece of geometry does to overlap any screen region (e.g. in a corresponding set) assigned to the GPU for object rendering.

The second set of shaders is then used for geometry testing and rendering of the second set of pieces of geometry. In particular, the second set of shaders of a command buffer is configured to perform geometry pretesting on the second set of pieces of geometry, as previously described. Then, geometry testing is performed at the plurality of GPUs on the second set of pieces of geometry to generate second information regarding each piece of geometry in the second set and its relation to each of the plurality of screen regions. Then, the second set of shaders is configured to perform rendering of the second set of pieces of geometry, as previously described. Thereafter, rendering of the second set of pieces of geometry is performed at each of the plurality of GPUs using the second information. As previously described, the information indicates which pieces of geometry overlap screen regions (e.g. of a corresponding set) assigned to a corresponding GPU for object rendering.

Though the above describes the plurality of GPUs as processing the geometry in lockstep (i.e. the plurality of GPUs performs geometry pretesting, then the plurality of GPUs performs rendering), in some embodiments the GPUs are not explicitly synchronized with each other, e.g. one GPU may be rendering the first set of pieces of geometry while a second GPU is performing geometry pretesting on the second set of pieces of geometry.

Figure 14:
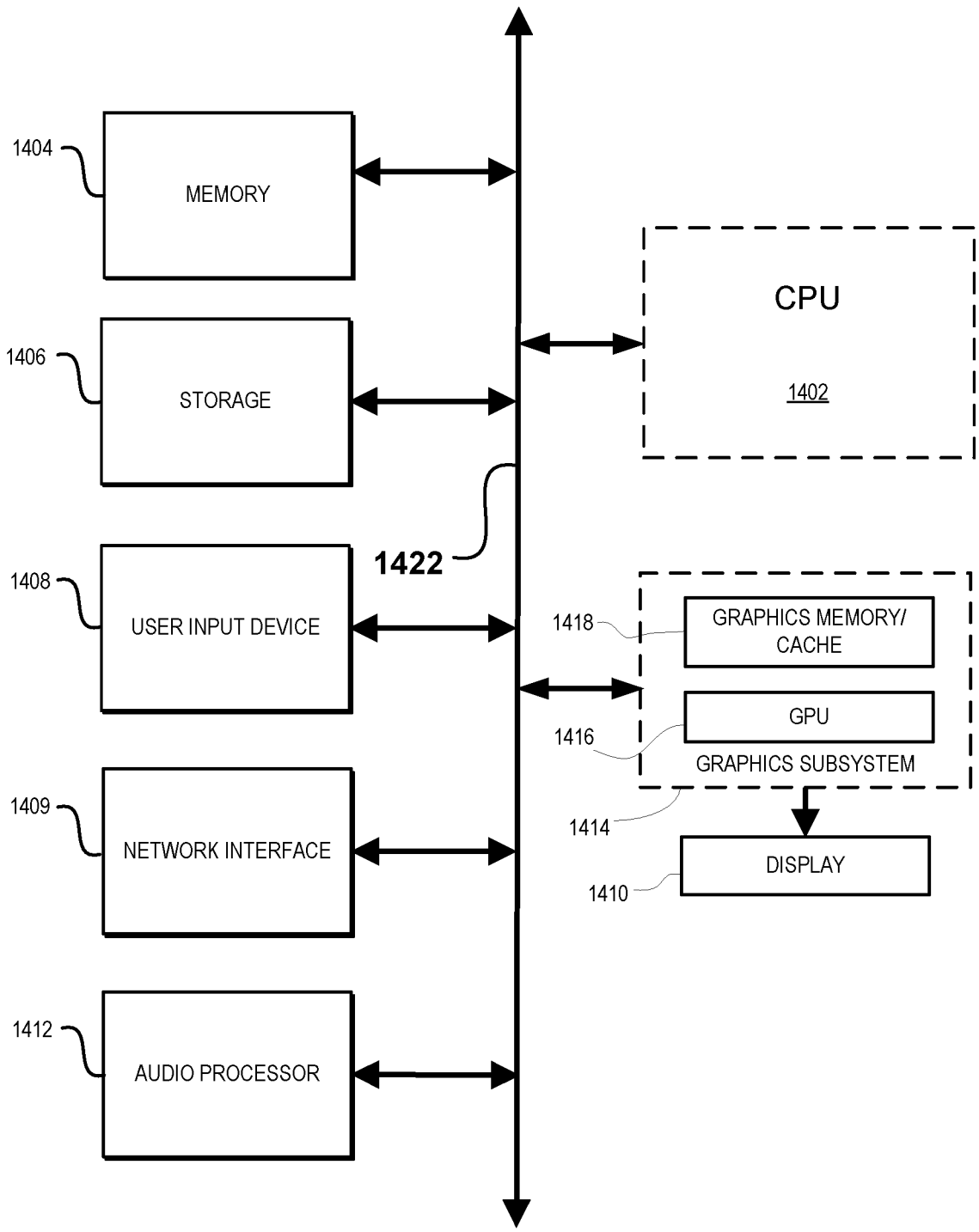
FIG. 14 illustrates components of an example device that can be used to perform aspects of the various embodiments of the present disclosure.

FIG. 14 illustrates components of an example device 1400 that can be used to perform aspects of the various embodiments of the present disclosure. For example, FIG. 14 illustrates an exemplary hardware system suitable for multi-GPU rendering of geometry for an application by pretesting geometry against screen regions, which may be interleaved, before rendering objects for an image frame, in accordance with embodiments of the present disclosure. This block diagram illustrates a device 1400 that can incorporate or can be a personal computer, a server computer, gaming console, mobile device, or other digital device, each of which is suitable for practicing an embodiment of the invention. Device 1400 includes a central processing unit (CPU) 1402 for running software applications and optionally an operating system. CPU 1402 may be comprised of one or more homogeneous or heterogeneous processing cores.

In accordance with various embodiments, CPU 1402 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 1404 stores applications and data for use by the CPU 1402 and GPU 1416. Storage 1406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1408 communicate user inputs from one or more users to device 1400, examples of which may include keyboards, mice, joysticks, touch pads, touch screens, still or video recorders/cameras, and/or microphones. Network interface 1409 allows device 1400 to communicate with other computer systems via an electronic communications network, and may include wired or wireless communication over local area networks and wide area networks such as the internet. An audio processor 1412 is adapted to generate analog or digital audio output from instructions and/or data provided by the CPU 1402, memory 1404, and/or storage 1406. The components of device 1400, including CPU 1402, graphics subsystem including GPU 1416, memory 1404, data storage 1406, user input devices 1408, network interface 1409, and audio processor 1412 are connected via one or more data buses 1422.

A graphics subsystem 1414 is further connected with data bus 1422 and the components of the device 1400. The graphics subsystem 1414 includes at least one graphics processing unit (GPU) 1416 and graphics memory 1418. Graphics memory 1418 includes a display memory (e.g. a frame buffer) used for storing pixel data for each pixel of an output image. Graphics memory 1418 can be integrated in the same device as GPU 1416, connected as a separate device with GPU 1416, and/or implemented within memory 1404. Pixel data can be provided to graphics memory 1418 directly from the CPU 1402. Alternatively, CPU 1402 provides the GPU 1416 with data and/or instructions defining the desired output images, from which the GPU 1416 generates the pixel data of one or more output images. The data and/or instructions defining the desired output images can be stored in memory 1404 and/or graphics memory 1418. In an embodiment, the GPU 1416 includes 3D rendering capabilities for generating pixel data for output images from instructions and data defining the geometry, lighting, shading, texturing, motion, and/or camera parameters for a scene. The GPU 1416 can further include one or more programmable execution units capable of executing shader programs.

The graphics subsystem 1414 periodically outputs pixel data for an image from graphics memory 1418 to be displayed on display device 1410, or to be projected by a projection system (not shown). Display device 1410 can be any device capable of displaying visual information in response to a signal from the device 1400, including CRT, LCD, plasma, and OLED displays. Device 1400 can provide the display device 1410 with an analog or digital signal, for example.

Other embodiments for optimizing the graphics subsystem 1414 could include multi-GPU rendering of geometry for an application by pretesting the geometry against screen regions, which may be interleaved, before rendering objects for an image frame. The graphics subsystem 1414 could be configured as one or more processing devices.

For example, the graphics subsystem 1414 may be configured to perform multi-GPU rendering of geometry for an application, wherein multiple graphics subsystems could be implementing graphics and/or rendering pipelines for a single application, in one embodiment. That is, the graphics subsystem 1414 includes multiple GPUs used for rendering an image or each of one or more images of a sequence of images when executing an application.

In other embodiments, the graphics subsystem 1414 includes multiple GPU devices, which are combined to perform graphics processing for a single application that is executing on a corresponding CPU. For example, the multiple GPUs can perform multi-GPU rendering of geometry for an application by pretesting the geometry against screen regions, which may be interleaved, before rendering objects for an image frame. In other examples, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g. if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g. a first shader operation) and compositing of outputs from slave GPU 2 and slave GPU 3, wherein slave GPU 2 could perform a second shader (e.g. fluid effects, such as a river) operation, the slave GPU 3 could perform a third shader (e.g. particle smoke) operation, wherein master GPU 1 composites the results from each of GPU 1, GPU 2, and GPU 3. In that manner, different GPUs can be assigned to perform different shader operations (e.g. flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for multi-GPU rendering of geometry for an application by pretesting the geometry against screen regions, which may be interleaved, before rendering of objects for an image frame or each of one or more image frames in a sequence of image frames when executing an application.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
rendering graphics for an application using a plurality of graphics processing units (GPUs);
dividing responsibility for the rendering of geometry of the graphics between the plurality of GPUs based on a plurality of screen regions, each GPU having a corresponding division of the responsibility which is known to the plurality of GPUs;
performing in a frame period geometry testing at a pretest GPU on a plurality of pieces of geometry of an image frame generated by the application to generate information regarding each of the plurality of pieces of geometry and its relation to each of the plurality of screen regions, wherein the geometry testing determines whether each of the plurality of pieces of geometry overlaps the each of the plurality of screen regions; and
rendering in the frame period the plurality of pieces of geometry at each of the plurality of GPUs using the information generated for the each of the plurality of pieces of geometry wherein based on the information a GPU renders a corresponding piece of geometry that overlaps a screen region that is assigned to the GPU for rendering,
wherein each of a plurality of frame periods defines a target period of time over which a corresponding image frame of a plurality of image frames is generated for display.

2. The method of claim 1,
wherein the pretest GPU is one of the plurality of GPUs.

3. The method of claim 1, further comprising:
skipping rendering of a piece of geometry at a rendering GPU when the information indicates that the piece of geometry does not overlap any screen region assigned to the rendering GPU based on the responsibility for the rendering of geometry of the graphics that is divided,
wherein the rendering GPU is one of the plurality of GPUs.

4. The method of claim 3,
wherein the piece of geometry corresponds to geometry used by or generated by a draw call.

5. The method of claim 4,
wherein the geometry used by or generated by the draw call of the application is subdivided into a second plurality of pieces of geometry, including the piece of geometry, for which the pretest GPU generates the information.

6. The method of claim 4,
wherein the piece of geometry is an individual primitive.

7. The method of claim 1,
wherein the information regarding a piece of geometry includes a vertex count or primitive count.

8. The method of claim 1, further comprising:
generating the information using a scan converter in a rasterization stage; or
generating the information using one or more shaders in a geometry processing stage.

9. The method of claim 1,
wherein one or more of the plurality of GPUs are portions of a larger GPU that is configured as a plurality of virtual GPUs.

10. A non-transitory computer-readable medium storing a computer program for performing a method, the computer-readable medium comprising:
program instructions for rendering graphics for an application using a plurality of graphics processing units (GPUs);
program instructions for dividing responsibility for the rendering of geometry of the graphics between the plurality of GPUs based on a plurality of screen regions, each GPU having a corresponding division of the responsibility which is known to the plurality of GPUs;

program instructions for performing in a frame period geometry testing at a pretest GPU on a plurality of pieces of geometry of an image frame generated by the application to generate information regarding each of the plurality of pieces of geometry and its relation to each of the plurality of screen regions, wherein the geometry testing determines whether each of the plurality of pieces of geometry overlaps the each of the plurality of screen regions; and program instructions for rendering in the frame period the plurality of pieces of geometry at each of the plurality of GPUs using the information generated for the each of the plurality of pieces of geometry, wherein based on the information a GPU renders a corresponding piece of geometry that overlaps a screen region that is assigned to the GPU for rendering, wherein each of a plurality of frame periods defines a target period of time over which a corresponding image frame of a plurality of image frames is generated for display.

11. The non-transitory computer-readable medium of claim 10,
wherein in the method the pretest GPU is one of the plurality of GPUs.

12. The non-transitory computer-readable medium of claim 10, further comprising:
program instructions for skipping rendering of a piece of geometry at a rendering GPU when the information indicates that the piece of geometry does not overlap any screen region assigned to the rendering GPU based on the responsibility for the rendering of geometry of the graphics that is divided,
wherein the rendering GPU is one of the plurality of GPUs.

13. The non-transitory computer-readable medium of claim 12,
wherein in the method the piece of geometry corresponds to geometry used by or generated by a draw call,
wherein in the method the geometry used by or generated by the draw call of the application is subdivided into a second plurality of pieces of geometry, including the piece of geometry, for which the pretest GPU generates the information.

14. The non-transitory computer-readable medium of claim 10,
wherein in the method the information regarding a piece of geometry includes a vertex count or primitive count.

15. The non-transitory computer-readable medium of claim 10, further comprising:
program instructions for generating the information using a scan converter in a rasterization stage; or
program instructions for generating the information using one or more shaders in a geometry processing stage.

16. A computer system comprising:
a processor;
memory coupled to the processor and having stored therein instructions that, if executed by the computer system, cause the computer system to execute a method for implementing a graphics pipeline, comprising:
rendering graphics for an application using a plurality of graphics processing units (GPUs);
dividing responsibility for the rendering of geometry of the graphics between the plurality of GPUs based on a plurality of screen regions, each GPU having a corresponding division of the responsibility which is known to the plurality of GPUs;
performing in a frame period geometry testing at a pretest GPU on a plurality of pieces of geometry of an image frame generated by the application to generate information regarding each of the plurality of pieces of geometry and its relation to each of the plurality of screen regions, wherein the geometry testing determines whether each of the plurality of pieces of geometry overlaps the each of the plurality of screen regions; and
rendering in the frame period the plurality of pieces of geometry at each of the plurality of GPUs using the information generated for the each of the plurality of pieces of geometry, wherein based on the information a GPU renders a corresponding piece of geometry that overlaps a screen region that is assigned to the GPU for rendering,
wherein each of a plurality of frame periods defines a target period of time over which a corresponding image frame of a plurality of image frames is generated for display.

17. The computer system of claim 16,
wherein in the method the pretest GPU is one of the plurality of GPUs.

18. The computer system of claim 16, the method further comprising:
skipping rendering of a piece of geometry at a rendering GPU when the information indicates that the piece of geometry does not overlap any screen region assigned to the rendering GPU based on the responsibility for the rendering of geometry of the graphics that is divided,
wherein the rendering GPU is one of the plurality of GPUs.

19. The computer system of claim 18,
wherein in the method the piece of geometry corresponds to geometry used by or generated by a draw call,
wherein in the method the geometry used by or generated by the draw call of the application is subdivided into a second plurality of pieces of geometry, including the piece of geometry, for which the pretest GPU generates the information.

20. The computer system of claim 16,
wherein in the method the information regarding a piece of geometry includes a vertex count or primitive count.

* * * * *